United States Patent
Saito

(10) Patent No.: US 7,606,185 B2
(45) Date of Patent: Oct. 20, 2009

(54) COMMUNICATION DEVICE FOR AUTOMOTIVE VEHICLE

(75) Inventor: Toshiya Saito, Hekinan (JP)

(73) Assignee: DENSO CORPORATION, Kariya (JP)

(*) Notice: Subject to any disclaimer, the term of this patent is extended or adjusted under 35 U.S.C. 154(b) by 604 days.

(21) Appl. No.: 11/407,232

(22) Filed: Apr. 20, 2006

(65) Prior Publication Data

US 2006/0248222 A1 Nov. 2, 2006

(30) Foreign Application Priority Data

Apr. 27, 2005 (JP) .............................. 2005-130415

(51) Int. Cl.
*H04B 7/00* (2006.01)
*H04W 24/00* (2006.01)
(52) U.S. Cl. ..................... 370/310; 701/200; 455/456.1
(58) Field of Classification Search ........................ None
See application file for complete search history.

(56) References Cited

U.S. PATENT DOCUMENTS

| 6,654,681 | B1 * | 11/2003 | Kiendl et al. ................ 701/117 |
| 6,720,920 | B2 * | 4/2004 | Breed et al. .................. 342/386 |
| 2004/0236499 | A1 * | 11/2004 | Watanabe ................... 701/200 |

FOREIGN PATENT DOCUMENTS

| JP | A-59-25437 | 2/1984 |
| JP | A-2004-54412 | 2/2004 |

OTHER PUBLICATIONS

Wischhof, et al., "SOTIS—A Self-Organizing Traffic Information System," *The 57th IEEE Semiannual Vehicular Technology Conference*, VTC 2003-Spring, Proceedings vol. 4, Jeju, Korea, Apr. 22-25, 2003, pp. 2442-2446.

* cited by examiner

*Primary Examiner*—Erika A Gary
(74) *Attorney, Agent, or Firm*—Posz Law Group, PLC

(57) ABSTRACT

A communication device for acquiring a traffic information includes: a communicating element; a request message transmitting element for transmitting a request message, which includes a request vehicle identification information, a target zone information and an information for specifying the traffic information; a request message receiving element for receiving the request message; a request message transferring element for transferring the request message; a response message transmitting element for transmitting a response message when the automotive vehicle is disposed in the target zone and when the traffic information is capable of retrieving; a response message receiving element for receiving the response message; a response message transferring element for transferring the response message when a vehicle is not a request vehicle; and an outputting element for outputting the traffic information when the vehicle is the request vehicle.

18 Claims, 26 Drawing Sheets

FIG. 6A
| HEADER | REQUEST VEHICLE CODE | TARGET ZONE CODE | REQUEST DATA CODE | TIME |
FIG. 6B
| HEADER | REQUEST VEHICLE CODE | RESPONSE VEHICLE CODE | TARGET ZONE CODE | REQUEST DATA | TIME |
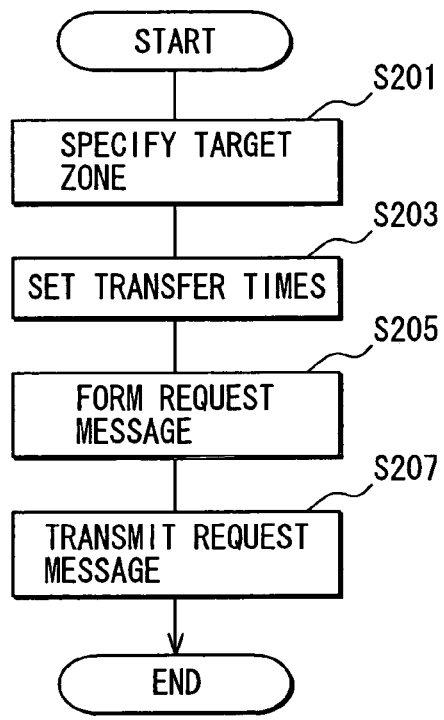
FIG. 9
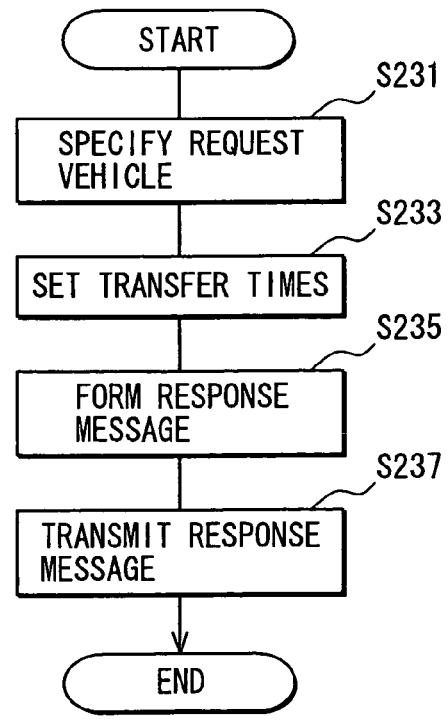
FIG. 11

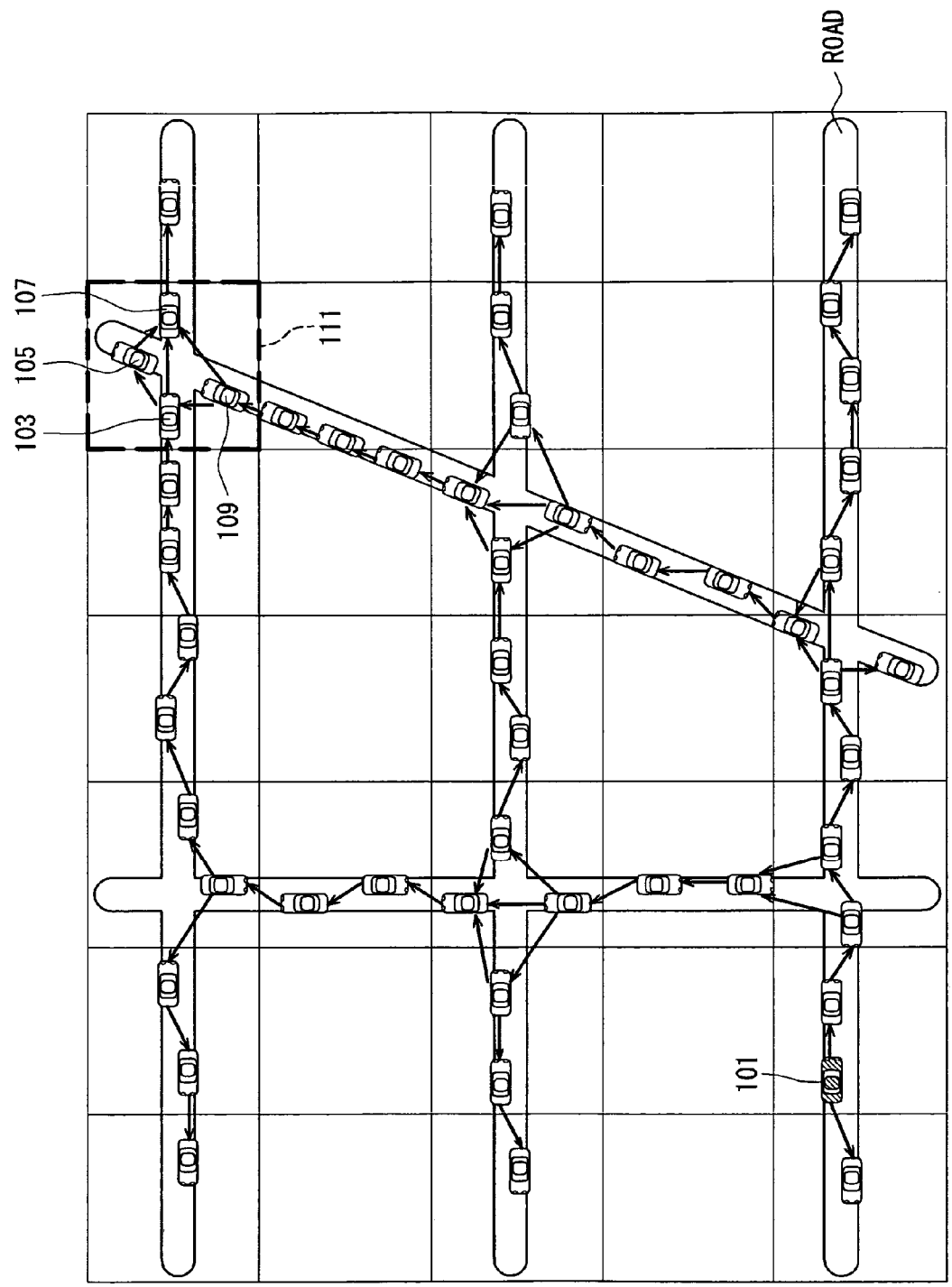

| HEADER | REQUEST VEHICLE CODE | TARGET ZONE CODE | REQUEST DATA CODE | TIME | TRANSFER TIMES |

| HEADER | REQUEST VEHICLE CODE | RESPONSE VEHICLE CODE | TARGET ZONE CODE | REQUEST DATA | TIME | TRANSFER TIMES |

| HEADER | REQUEST VEHICLE CODE | TARGET ZONE CODE | TRANSFER ZONE CODE LIST | REQUEST DATA CODE | TIME |

| HEADER | REQUEST VEHICLE CODE | RESPONSE VEHICLE CODE | TARGET ZONE CODE | TRANSFER ZONE CODE LIST | REQUEST DATA | TIME |

| HEADER | REQUEST VEHICLE CODE | REQUEST ZONE CODE | TARGET ZONE CODE | REQUEST DATA CODE | TIME |

| HEADER | REQUEST VEHICLE CODE | RESPONSE VEHICLE CODE | REQUEST ZONE CODE | TARGET ZONE CODE | REQUEST DATA | TIME |

COMMUNICATION DEVICE FOR AUTOMOTIVE VEHICLE

CROSS REFERENCE TO RELATED APPLICATION

This application is based on Japanese Patent Application No. 2005-130415 filed on Apr. 27, 2005, the disclosure of which is incorporated herein by reference.

FIELD OF THE INVENTION

The present invention relates to a communication device for an automotive vehicle.

BACKGROUND OF THE INVENTION

For example, a technique shown in Japanese Patent Application Publication No. S59-25437 is conventionally known as a technique for avoiding inquiry concentration in the communication between automobiles (so-called communication between vehicles). In this technique, while an inquiry automobile dynamically establishes a transmission path through another relay automobile, a vehicle possessing response information of a predetermined desirable area is retrieved. The retrieved response information possessing vehicle sends-out the response information to the transmission path previously established so that the response information is transmitted to the inquiry automobile. In this case, all the relay automobiles and inquiry automobile possess the sent-out response information. With respect to the subsequent same inquiry, each of the relay automobiles and the inquiry automobile sends out the response information so that the inquiry concentration can be avoided.

Each automobile is managed by a wireless base station in every area. When the automobile is advanced into a jurisdiction area, the wireless base station gives an identification number to its automobile. When the automobile having the given identification number is retired from the jurisdiction area, the given identification number is deprived and information collected during a movement of this automobile within the jurisdiction area is collected from this automobile and is held. The communication device is constructed so as to retrieve and acquire information mutually held in the wireless base stations.

Therefore, even when no inquiry automobile can retrieve the response information possessing vehicle (no transmission path can be established), the information of a predetermined desirable area can be acquired by making an inquiry to the wireless base station of the existing area of the inquiry automobile.

In the technique described in Japanese Patent Application Publication No. S59-25437, the relay automobile is selected by an angle formed by an advancing direction of the inquiry automobile and the direction of a destination area (an area desirous to acquire information), an angle formed by the advancing direction of the relay automobile and the direction of the destination area, etc. so as to efficiently establish the transmission path. Such angles are momentarily changed as the automobile is moved. Moreover, such angles are greatly changed in accordance with the shape of a road and right and left turnings of the vehicle. Therefore, high speed calculation capability is required in the communication device of each automobile.

Further, information relating to the direction of the destination area is adapted so as to be acquired from the wireless base station. Therefore, it is indispensable that the communication device can communicate with the wireless base station. When the automobile passes through a place unable to communicate with the wireless base station as in the interior of a tunnel, a problem exists in that no relay automobile can be selected and no transmission path can be established.

SUMMARY OF THE INVENTION

In view of the above-described problem, it is an object of the present invention to provide a communication device for an automotive vehicle.

A communication device for an automotive vehicle includes: a traffic information possessing means for possessing a traffic information regarding a self vehicle; a zoning means for dividing a predetermined area into a plurality of zones in a two-dimensional grid; a target zone specifying means for specifying a single target zone or a plurality of target zones from a plurality of zones, wherein the single target zone or each of a plurality of target zones includes a target communication device as an acquisition object of the traffic information; a positioning data acquiring means for acquiring a positioning data of the self vehicle; a communicating means for communicating with at least one of a plurality of cooperative communication devices by wireless, wherein a plurality of cooperative communication devices is disposed around the self vehicle; a data request message transmitting/controlling means for transmitting a data request message to at least one of a plurality of cooperative communication devices through the communicating means, wherein the data request message defines a data request vehicle identification information, the single target zone or a plurality of target zones, and an information for specifying the traffic information of the acquisition object, and wherein the data request vehicle identification information defines an identification information of a data request vehicle; a data request message receiving/controlling means for receiving the data request message, which is transmitted from at least one of a plurality of cooperative communication devices through the communicating means; a data request message transferring/controlling means for transferring the data request message received by the data request message receiving/controlling means to at least one of a plurality of cooperative communication devices; a data response message transmitting/controlling means for transmitting a data response message to at least one of a plurality of cooperative communication devices through the communicating means in a case where the self vehicle is disposed in the single target zone or a plurality of target zones defined in the data request message received by the data request message receiving/controlling means and where the traffic information of the acquisition object defined in the data request message is capable of transmitting and retrieving from the traffic information possessed in the traffic information possessing means, wherein the data response message defines the data request vehicle identification information defined in the data request message and the traffic information of the acquisition object defined in the data request message; a data response message receiving/controlling means for receiving the data response message through the communicating means from at least one of a plurality of cooperative communication devices; a data response message transferring/controlling means for transferring the data response message received by the data response message receiving/controlling means to at least one of a plurality of cooperative communication devices through the communicating means in a case where an identification information of the self vehicle does not correspond to the data request vehicle identification information defined in the data response message received by the data response message receiving/controlling means; and a data outputting means for outputting the traffic information of the acquisition object included in the data response message received by the data response message receiving/controlling means in a case where the identification information of the self vehicle corresponds to the data request vehicle identification information defined in the data response message received by the data response message receiving/controlling means.

Thus, when the communication device of the present invention functions as a relaying (transferring) communication device, judgment processing is only "whether or not the self vehicle exists within the target zone and the operation information designated in the data request message is possessed or not", or "whether the data request vehicle identification information designated in the data response message and the identification information of the self vehicle are conformed or not". Therefore, required calculation capability can be set to be small in comparison with the background art case. Further, since the communication device of the present invention has the zone generating means, the information of a zone required in the communication can be personally generated. Accordingly, it is not necessary to acquire the information of the construction of the zone and the place of an object zone from a wireless base station, etc.

Thus, the above communication device establishes the transmission path without communicating with the wireless base station in a transmission path and establishes a method for restraining required calculation capability as much as possible. Further, the device directly performs communication between cooperative communication devices or performs communication through another cooperative communication device.

Further, a communication device for acquiring a traffic information of an acquisition object is provided. The communication device is mounted on an automotive vehicle. The device includes: a communicating element for communicating with at least one of a plurality of cooperative communication devices, which is disposed around the communication device; a request message transmitting element for transmitting a request message to at least one of a plurality of cooperative communication devices through the communicating element, wherein the request message includes a request vehicle identification information, a target zone information and an information for specifying the traffic information of the acquisition object, wherein the request vehicle identification information defines an identification information of a request vehicle, which requests the traffic information of the acquisition object, and wherein the target zone information defines a target zone, in which a target communication device as the acquisition object is disposed; a request message receiving element for receiving the request message, which is transmitted from at least one of a plurality of cooperative communication devices; a request message transferring element for transferring the request message to at least one of a plurality of cooperative communication devices, the request message received by the request message receiving element; a response message transmitting element for transmitting a response message to at least one of a plurality of cooperative communication devices when the automotive vehicle is disposed in the target zone and when the traffic information of the acquisition object is capable of transmitting and retrieving from the traffic information of the automotive vehicle, wherein the response message includes the request vehicle identification information and the traffic information of the acquisition object; a response message receiving element for receiving the response message from at least one of a plurality of cooperative communication devices; a response message transferring element for transferring the response message to at least one of a plurality of cooperative communication devices when the automotive vehicle is not the request vehicle; and an outputting element for outputting the traffic information of the acquisition object to an external circuit when the automotive vehicle is the request vehicle.

Thus, the above communication device establishes the transmission path without communicating with the wireless base station in a transmission path and establishes a method for restraining required calculation capability as much as possible. Further, the device directly performs communication between cooperative communication devices or performs communication through another cooperative communication device.

BRIEF DESCRIPTION OF THE DRAWINGS

The above and other objects, features and advantages of the present invention will become more apparent from the following detailed description made with reference to the accompanying drawings. In the drawings:

FIG. 6A is a chart showing a data request message, and FIG. 6B is a chart showing a data response message, according to the first embodiment;

FIG. 7 is a map explaining a method for transferring a data request message, according to the first embodiment;

FIG. 9 is a flow chart showing a data request message transmitting process, according to a second embodiment of the present invention;

FIG. 11 is a flow chart showing a data response message transmitting process, according to the second embodiment;

DETAILED DESCRIPTION OF THE PREFERRED EMBODIMENTS

Embodiment modes applying the present invention thereto will next be explained by using the drawings. The embodiment modes of the present invention are not limited to the following embodiment modes, but various modes can be adopted as long as these modes belong to the technical scope of the present invention.

First Embodiment Mode

Figure 1:
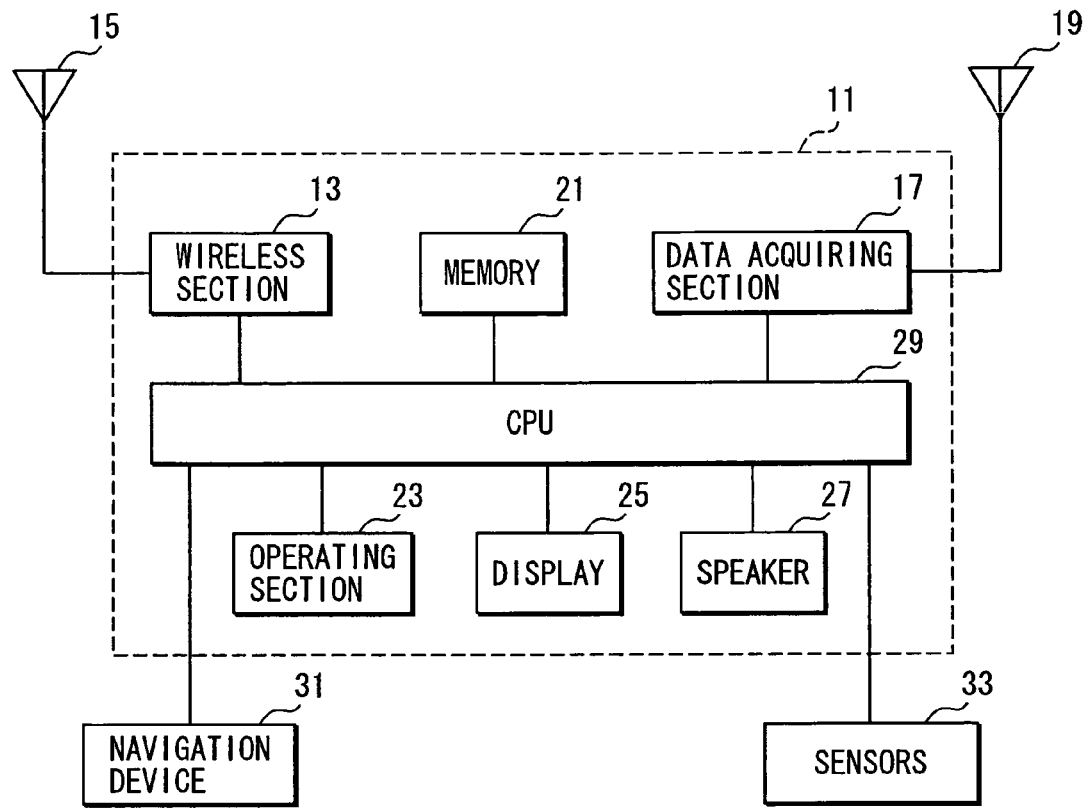
FIG. 1 is a block diagram showing a communication device according to a first embodiment of the present invention.

FIG. 1 is a block diagram showing the schematic construction of a communication device 11 of a first embodiment mode applying the present invention thereto. The communication device 11 is mounted to a vehicle and is used. The communication device 11 mainly has a wireless communication section 13, a wireless antenna 15 connected to this wireless communication section 13, a position data acquiring section 17, a GPS antenna 19 connected to this position data acquiring section 17, a memory 21, an operating section 23, a display section 25, a speaker 27 and a CPU 29. A navigation device 31 and a sensor group 33 are connected to this communication device 11.

The wireless communication section 13 is a part for bearing near distance wireless communication with another communication device through the wireless antenna 15. For example, the communication of a system applied correspondingly to IEEE 802.11b is considered as the near distance wireless communication, and a prospect distance of about 100 m is supposed.

The wireless antenna 15 is an antenna used in the above near distance wireless communication, and may be also an antenna of any shape such as a whip antenna, a planar antenna, etc.

The position data acquiring section 17 is a part for receiving a signal from a GPS (Global Positioning System) satellite through the GPS antenna 19, and calculating the present position of a vehicle mounting the communication device 11 thereto. In this embodiment mode, the position data acquiring section 17 is adapted so as to receive the signal from the GPS satellite and calculate the present position, but this part may be also substituted by acquiring information relating to the present position from the navigation device 31.

The GPS antenna 19 is an antenna for receiving the signal from the GPS satellite.

The memory 21 is a part in which the CPU 29 uses this memory 21 for the purpose of a temporary memory area, etc. of data. The memory 21 is constructed by a ROM, a RAM, a SRAM, etc. A program executed by the CPU 29 is stored to the ROM.

The operating section 23 is a part constructed by a key switch, etc. and receiving various input commands from an operator.

The display section 25 is a part constructed by a liquid crystal display, an organic EL display, etc., and bearing a function for displaying various information acquired by the communication device 11.

The speaker 27 is a part bearing a function for outputting various information acquired by the communication device 11 by a voice.

The CPU 29 is a part bearing a function for inputting signals from the wireless communication section 13, the position data acquiring section 17, the memory 21, the operating section 23, the navigation device 31 and the sensor group 33, and executing various processings on the basis of programs, and outputting signals to the memory 21, the display section 25 and the speaker 27.

The navigation device 31 is a widely known navigation device for executing a path guide, etc. The navigation device 31 has map data (node data, link data, cost data, background data, road data, name data, mark data, intersecting point data, data of facilities, etc.) and is constructed so as to supply these map data to the CPU 29.

The sensor group 33 is various kinds of sensors (e.g., a speed sensor, a brake sensor, a direction indicator sensor, etc.) arranged in respective portions of the vehicle.

Various kinds of processings executed by the CPU 29 will next be explained.

(1) Data Request Message Transmission Processing

First, data request message transmission processing will be explained by using the flow chart of FIG. 2. This data request message transmission processing begins to be executed when the operating section 23 receives an operation of the command of execution of the data request message transmission processing.

When the CPU 29 begins to execute the data request message transmission processing, the CPU 29 first specifies a target zone (S101). The "zone" said here is generated by dividing a map by predetermined latitude and longitude on the basis of map data acquired from the navigation device 31 by the CPU 29. Concretely, this zone means an area of an approximately square shape having one side of about several hundred meters to several kilometers. With respect to a generating technique of this "zone", a similar technique is also used in another communication device, and zones of the same shape and number are generated. "Specify" means that the operating section 23 selects and determines one or plural zones on the basis of a receiving command. Concretely, for example, when an operator performs an operation of the command of "it is desirous to acquire traffic information of a XX district", "specify" is to select a zone corresponding to this XX district and determine this zone as the "target zone".

Subsequently, a data request message is made (S103). Here, a format of this data request message will be explained. As shown in FIG. 6A, the data request message is constructed by a header, a data request vehicle code, a target zone code, a request data code and time. The header shows information showing that it is the data request message. The data request vehicle code is a code for identifying the vehicle mounting the communication device making this message. For example, information described in a number plate of the vehicle is considered as this data request vehicle code. The target zone code is a code of the target zone specified by the step S101. This code can be also commonly used in another communication device, and the same code shows the same zone. The request data code is a code showing required data, and is, e.g., a code showing traffic information, a code showing weather information, etc. The above time is a making time of the data request message.

The explanation is returned to FIG. 2, and the data request message is subsequently transmitted to all the other communication devices existing in the vicinity through the wireless communication section 13 and the wireless antenna 15 (S105). The communication device receiving this data request message executes data request message reception-transfer processing explained next.

When the transmission of the data request message is terminated, the present processing (data request message transmission processing) is terminated.

(2) Data Request Message Reception-Transfer Processing

Figure 3:
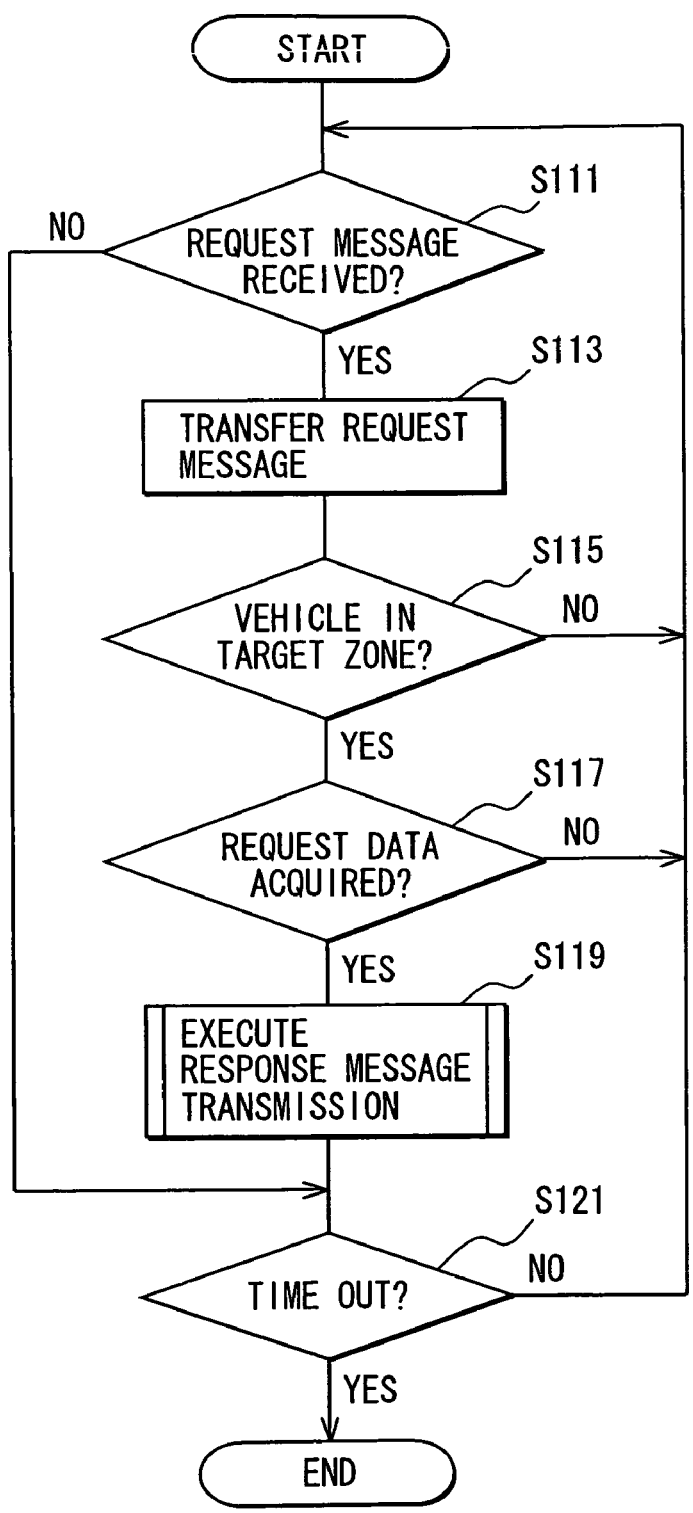
FIG. 3 is a flow chart showing a data request message receiving/transferring process, according to the first embodiment.

The data request message reception-transfer processing will next be explained by using the flow chart of FIG. 3. This data request message reception-transfer processing is processing which begins to be executed in the CPU 29 in supplying electric power to the communication device 11.

When the CPU 29 starts the execution of the data request message reception-transfer processing, the CPU 29 first tries the reception of the data request message from another communication device through the wireless communication section 13, and judges whether the data request message can be received or not (S111). When it is judged that no data request message can be received (S111: No), it proceeds to S121 described later. In contrast to this, when it is judged that the data request message can be received (S111: Yes), the CPU 29 transfers the received data request message to the other communication devices except for the communication device previously performing the signal reception (S113).

Subsequently, it is judged whether a self vehicle (the vehicle mounting the communication device 11 thereto) exists in the target zone included in the received data request message or not (S115). This judgment is made on the basis of a zone generated by dividing a map by predetermined latitude and longitude on the basis of map data acquired from the navigation device 31, and data relating to the present position acquired from the position data acquiring section 17. When it is judged that no self vehicle exists in the target zone (S115: No), the processing proceeds to the above S111. In contrast to this, when it is judged that the self vehicle exists in the target zone (S115: Yes), it proceeds to S117.

In S117, it is judged whether data (e.g., traffic information, weather information, etc.) corresponding to the request data code included in the received data request message are possessed (or can be acquired) or not. This judgment is made by including data able to be acquired from the navigation device 31 and data able to be acquired from the sensor group 33 in addition to data stored by the memory 21. When it is judged that the data corresponding to the request data code are not possessed (or cannot be acquired) (S117: No), the processing proceeds to the above S111. In contrast to this, when it is judged that the data corresponding to the request data code are possessed (or can be acquired) (S117: Yes), data response message transmission processing described later is executed (S119). When the data response message transmission processing is terminated, it is judged whether the time from the beginning of the data request message reception-transfer processing exceeds a predetermined time or not (S121). This judgment has the meaning that the data request message reception-transfer processing is normally terminated in a program. When it is desirous to terminate the data request message reception-transfer processing in another processing (program), etc., this processing (program), etc. are realized by rewriting the above predetermined time as e.g., "0".

In this S121, when it is judged that the time from the beginning of the data request message reception-transfer processing exceeds the predetermined time (S121: Yes), this processing (data request message reception-transfer processing) is terminated. In contrast to this, when it is judged that no time from the beginning of the data request message reception-transfer processing exceeds the predetermined time (S121: No), the processing proceeds to the above step S111.

(3) Data Response Message Transmission Processing

Data response message transmission processing will next be explained by using the flow chart of FIG. 4. This data response message transmission processing is processing called out and executed in S119 of the above data request message reception-transfer processing.

When the CPU 29 starts the data response message transmission processing, the CPU 29 first specifies a data request vehicle (S131). This specifying is performed by extracting the data request vehicle code included in the data request message acquired in the data request message reception-transfer processing.

Subsequently, a data response message is made (S133). This making is to acquire data corresponding to the request data code included in the data request message acquired in the data request message reception-transfer processing from the memory 21, the navigation device 31 or the sensor group 33, and construct the data response message in accordance with a format. Here, the format of the data response message will be explained. As shown in FIG. 6B, the data response message is constructed by a header, a data request vehicle code, a data response vehicle code, a target zone code, request data and time. The header shows information showing that it is the data response message. The data request vehicle code is a code for identifying the vehicle mounting the communication device making the data request message, and is included in the acquired data request message. The data response vehicle code is a code for identifying the vehicle mounting the communication device making this message. For example, information described in a number plate of the vehicle is considered as this data response vehicle code. The target zone code is the same as the target zone code included in the acquired data request message. The request data are data corresponding to the request data code included in the acquired data request message, and are acquired from the memory 21, the navigation device 31 or the sensor group 33. The above time is a making time of the data response message.

The explanation is returned to FIG. 4, and the data response message made in S133 is subsequently transmitted to all the other communication devices existing in the vicinity through the wireless communication section 13 and the wireless antenna 15 (S135). When this signal transmission is terminated, this processing (data response message transmission processing) is terminated and the processing proceeds to a subsequent step (S121) in the data request message reception-transfer processing as a calling-out source.

(4) Data Response Message Reception-Transfer Processing

Figure 5:
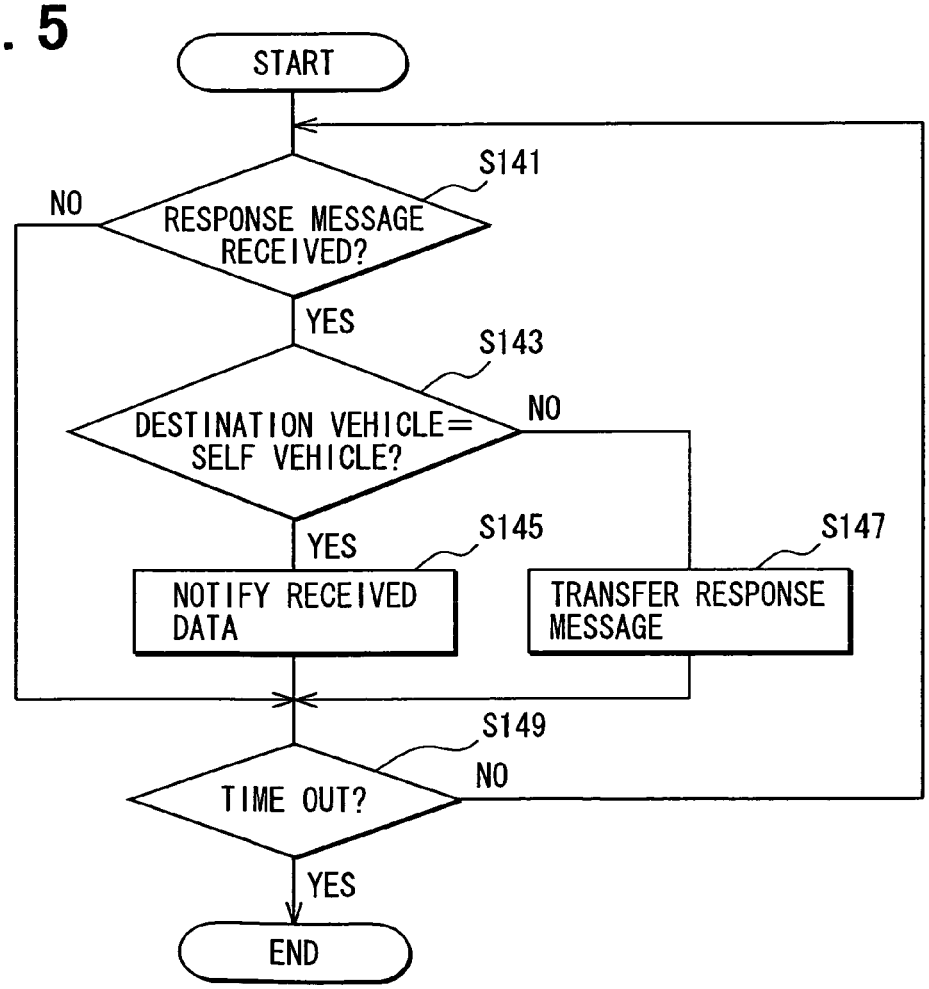
FIG. 5 is a flow chart showing a data response message receiving/transferring process, according to the first embodiment.

Data response message reception-transfer processing will next be explained by using the flow chart of FIG. 5. This data response message reception-transfer processing is processing beginning to be executed in the CPU 29 in supplying electric power to the communication device 11.

When the CPU 29 starts the execution of the data response message reception-transfer processing, the CPU 29 first tries the reception of the data response message from another communication device through the wireless communication section 13, and judges whether the data response message can be received or not (S141). When it is judged that no data response message can be received (S141: No), it proceeds to S149 described later. In contrast to this, when it is judged that the data response message can be received (S141: Yes), it is judged whether the vehicle corresponding to the data request vehicle code included in the received data response message is a self vehicle (the vehicle mounting the communication device 11 thereto) or not (S143).

When it is judged in this S143 that the vehicle corresponding to the data request vehicle code is a self vehicle (S143: Yes), the CPU 29 notifies the request data in the received data response message, i.e., traffic information, weather information, etc. (S145). Concretely, this notification is performed by displaying the request data in the display section 25, and outputting the request data to the speaker 27 as a voice. The processing then proceeds to S149.

In contrast to this, when it is judged in S143 that no vehicle corresponding to the data request vehicle code is a self vehicle (S143: No), the data response message received in S141 is transferred to the other communication devices except for the communication device previously performing the signal reception (S147). The processing then proceeds to S149.

In S149, it is judged whether the time from the beginning of the data response message reception-transfer processing exceeds a predetermined time or not. This judgment has the meaning that the data response message reception-transfer processing is normally terminated in a program. When it is desirous to terminate the data response message reception-transfer processing in another processing (program), etc., this processing (program), etc. are realized by rewriting the above predetermined time as e.g., "0".

When it is judged in this S149 that the time from the beginning of the data response message reception-transfer processing exceeds the predetermined time (S149: Yes), this processing (data response message reception-transfer processing) is terminated. In contrast to this, when it is judged that no time from the beginning of the data response message reception-transfer processing exceeds the predetermined time (S149: No), the processing proceeds to the above S141.

Here, one example of a transferring situation of the data request message will be explained by using the explanatory view of FIG. 7. FIG. 7 shows a map divided into zones of 7×5 measures, and each vehicle mounting the communication device 11 thereto is running a road. In the communication device 11 mounted to a data request vehicle 101, it is now supposed that a target zone 111 is designated and the data request message is transmitted to the communication device 11 mounted to an adjacent vehicle. Thus, in the communication device 11 mounted to the vehicle adjacent to the data request vehicle 101, the data request message reception-transfer processing is executed and the data request message is further transferred. The data request message is transferred by this repetition irrespective of the zone. The data request message is also transferred to vehicles 103 to 109 existing in the target zone 111, and the data response message transmission processing is executed in the communication device 11 mounted to each vehicle.

Figure 8:
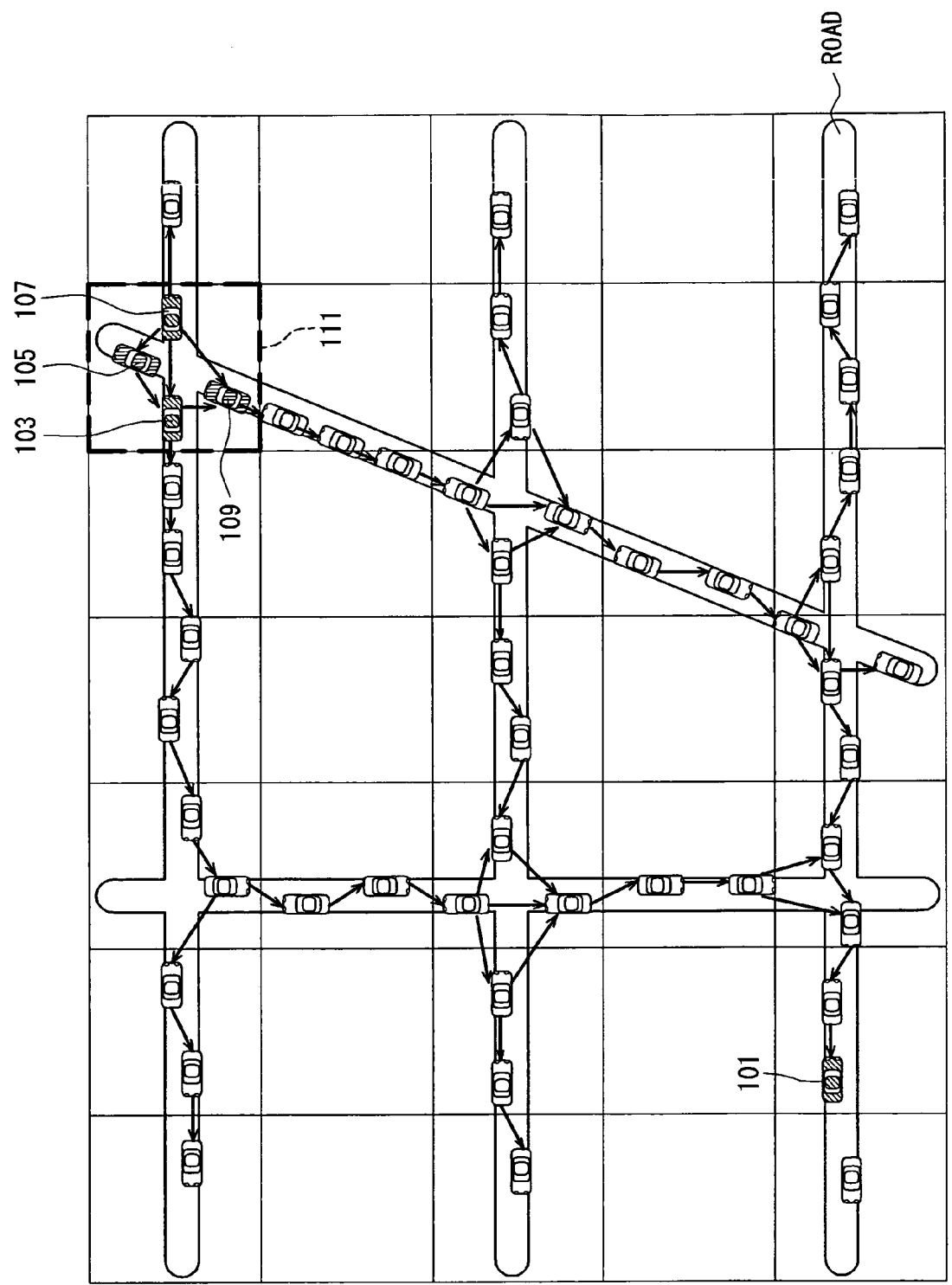
FIG. 8 is a map explaining a method for transferring a data response message, according to the first embodiment.

Next, one example of a transferring situation of the data response message will be explained by using the explanatory view of FIG. 8. FIG. 8 shows a map divided into zones of 7×5 measures, and each vehicle mounting the communication device 11 thereto is running a road. In vehicles 103 to 109 existing in the target zone 111, it is now supposed that the data response message transmission processing is executed and the data response message is transmitted to the communication device 11 mounted to an adjacent vehicle. Thus, in the communication device 11 mounted to the vehicle adjacent to these vehicles 103 to 109, the data response message reception-transfer processing is executed and the data response message is further transferred. The data response message is transferred by this repetition irrespective of the zone. The data response message is also transferred to the data request vehicle 101, and acquired data are notified in the communication device 11 mounted to the data request vehicle 101.

The communication device 11 of the first embodiment mode has been explained above. However, in accordance with the communication device 11 of this embodiment mode, judgment processing in a case functioning as a relaying (transferring) communication device is only "whether or not the self vehicle exists within the target zone and information designated by the data request message is possessed" (S115, S117), or "whether the data request vehicle designated in the data response message and the self vehicle are conformed or not" (S143). Therefore, required calculation capability can be set to be small in comparison with the background art case. Further, the communication device 11 of this embodiment mode acquires map data from the navigation device 31 so that the zone can be generated within the self device. Therefore, it is not necessary to acquire information of the zone construction and the place of an object zone from the wireless base station.

Second Embodiment Mode

The communication device 11 of a second embodiment mode will next be explained. The construction of the communication device 11 of the second embodiment mode is similar to that of the communication device 11 of the first embodiment mode, and its explanation is therefore omitted.

Various kinds of processings executed by the CPU 29 will be explained.

(1) Data Request Message Transmission Processing

First, data request message transmission processing will be explained by using the flow chart of FIG. 9. This data request message transmission processing begins to be executed when the operating section 23 receives an operation of the command of execution of the data request message transmission processing.

When the execution of the data request message transmission processing is started, the CPU 29 first specifies a target zone (S201). The "zone" said here is generated by dividing a map by predetermined latitude and longitude on the basis of map data acquired from the navigation device 31 by the CPU 29. Concretely, for example, the "zone" means an area of an approximately square shape having one side of about several hundred meters to several kilometers. With respect to a generating technique of this "zone", a similar technique is also used in another communication device, and zones of the same shape and number are generated. Further, "specifying" means that the operating section 23 selects and determines one or plural zones on the basis of a receiving command. Concretely, for example, when an operator performs an operation of the command of "it is desirous to acquire traffic information of a XX district", "specifying" is to select a zone corresponding to this XX district and determine this zone as the "target zone".

Subsequently, the number of transfer times is set (S203). This transfer time number is set to a data request message described later. A predetermined transfer time number may be used and the transfer time number may be also set on the basis of a command received from an operator by the operating section 23.

Figures 13A, 13B, 14:
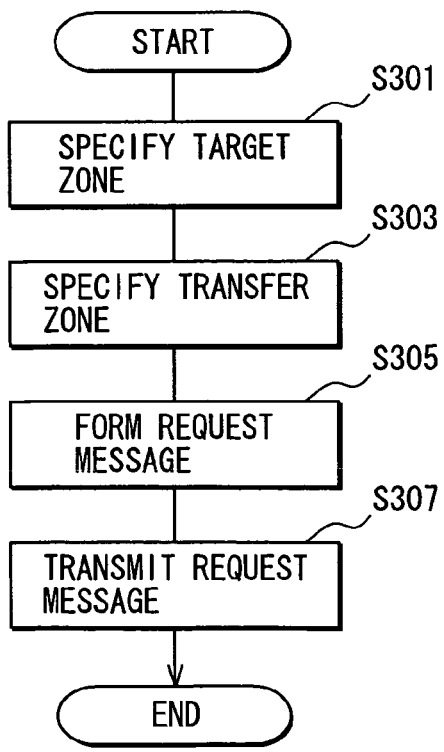
FIG. 13A is a chart showing a data request message.
FIG. 13B is a chart showing a data response message, according to the second embodiment.
FIG. 14 is a flow chart showing a data request message transmitting process, according to a third embodiment of the present invention.

Subsequently, the data request message is made (S205). Here, a format of this data request message will be explained. As shown in FIG. 13A, the data request message is constructed from a header, a data request vehicle code, a target zone code, a request data code, time and a transfer time number. The header shows information showing that it is the data request message. The data request vehicle code is a code for identifying a vehicle mounting a communication device making this message. For example, information described in a number plate of the vehicle is considered as this data request vehicle code. The target zone code is a code of the target zone specified in S201. This code can be also commonly used in another communication device, and the same code shows the same zone. The request data code is a code showing requested data, and is e.g., a code showing traffic information, a code showing weather information, etc. The above time is a making time of the data request message. The transfer time number is the remaining time number for transferring the data request message, and is set in S203.

The explanation is returned to FIG. 9, and the data request message is subsequently transmitted to all the other communication devices existing in the vicinity through the wireless communication section 13 and the wireless antenna 15 (S207). The communication device receiving this data request message executes the data request message reception-transfer processing explained next.

When the transmission of the data request message is terminated, this processing (data request message transmission processing) is terminated.

(2) Data Request Message Reception-Transfer Processing

Figure 10:
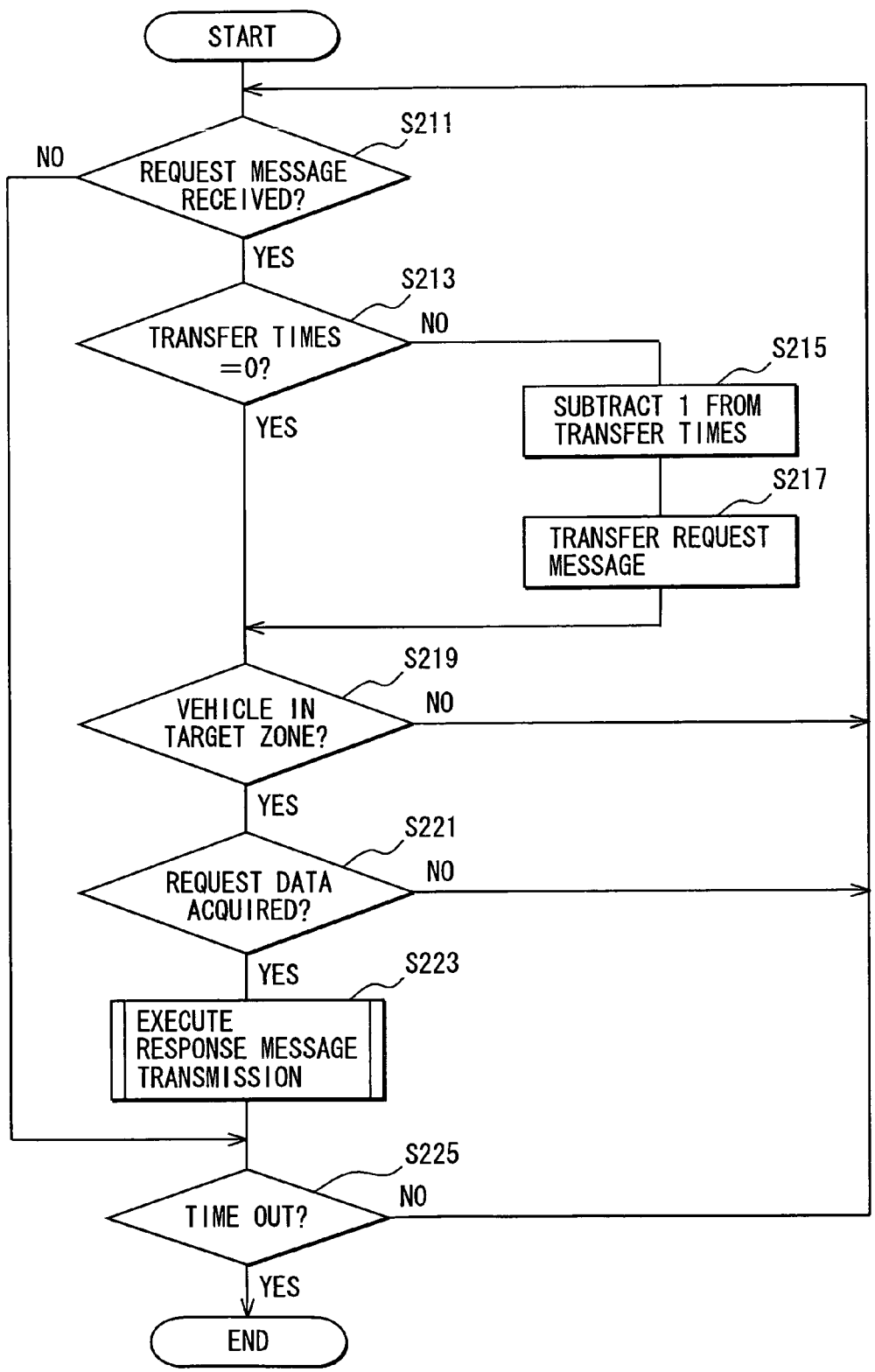
FIG. 10 is a flow chart showing a data request message receiving/transferring process, according to the second embodiment.

Next, the data request message reception-transfer processing will be explained by using the flow chart of FIG. 10. This data request message reception-transfer processing is processing beginning to be executed in the CPU 29 in supplying electric power to the communication device 11.

When the execution of the data request message reception-transfer processing is started, the CPU 29 first tries the reception of the data request message from another communication device through the wireless communication section 13, and judges whether the data request message can be received or not (S211). When it is judged that no data request message can be received (S211: No), it proceeds to S225 described later. In contrast to this, when it is judged that the data request message can be received (S211: Yes), it is judged whether the value of the transfer time number included in the received data request message is "0" or not (S213).

When it is judged in this S213 that no value of the transfer time number included in the received data request message is "0" (S213: No), the value of the transfer time number is subtracted by one (S215), and this subtracted value is set to the data request message, and is transferred to the other communication devices except for the communication device previously performing the signal reception (S217). It then proceeds to S219.

In contrast to this, when it is judged in S213 that the value of the transfer time number included in the received data request message is "0" (S213: Yes), it proceeds to S219.

In S219, it is judged whether a self vehicle (the vehicle mounting the communication device 11 thereto) exists in the target zone included in the received data request message or not. This judgment is made on the basis of a zone generated by dividing a map by predetermined latitude and longitude on the basis of map data acquired from the navigation device 31, and data relating to the present position acquired from the position data acquiring section 17. When it is judged that no self vehicle exists in the target zone (S219: No), the processing proceeds to the above S211. In contrast to this, when it is judged that the self vehicle exists in the target zone (S219: Yes), it proceeds to S221.

In S221, it is judged whether data (e.g., traffic information, weather information, etc.) corresponding to the request data code included in the received data request message are possessed (or can be acquired) or not. This judgment is made by including data able to be acquired from the navigation device 31 and data able to be acquired from the sensor group 33 in addition to data stored by the memory 21. When it is judged that the data corresponding to the request data code are not possessed (or cannot be acquired) (S221: No), the processing proceeds to the above S211. In contrast to this, when it is judged that the data corresponding to the request data code are possessed (or can be acquired) (S221: Yes), the data request message transmission processing described later is executed (S223) When the data request message transmission processing is terminated, it is judged whether the time from the beginning of the data request message reception-transfer processing exceeds a predetermined time or not (S225). This judgment has the meaning that the data request message reception-transfer processing is normally terminated in a program. When it is desirous to terminate the data request message reception-transfer processing in another processing (program), etc., this processing (program), etc. are realized by rewriting the above predetermined time as e.g., "0".

When it is judged in this S225 that the time from the beginning of the data request message reception-transfer processing exceeds the predetermined time (S225: Yes), this processing (data request message reception-transfer processing) is terminated. In contrast to this, when it is judged that no time from the beginning of the data request message reception-transfer processing exceeds the predetermined time (S225: No), the processing proceeds to the above S211.

(3) Data Response Message Transmission Processing

Next, the data response message transmission processing will be explained by using the flow chart of FIG. 11. This data response message transmission processing is processing called out and executed in S223 of the above data request message reception-transfer processing.

When the data response message transmission processing is started, the CPU 29 first specifies a data request vehicle (S231). This specifying is performed by extracting the data request vehicle code included in the data request message acquired in the data request message reception-transfer processing.

Subsequently, the transfer time number is set (S233). This transfer time number is set to a data response message described later, and a predetermined transfer time number may be used and the transfer time number may be also set on the basis of a command received from an operator by the operating section 23.

Subsequently, the data response message is made (S235). This making is to acquire data corresponding to the request data code included in the data request message acquired in the data request message reception-transfer processing from the memory 21, the navigation device 31 or the sensor group 33, and construct the data response message in accordance with a format. Here, the format of the data response message will be explained. As shown in FIG. 13B, the data response message is constructed by a header, a data request vehicle code, a data response vehicle code, a target zone code, request data, time and a transfer time number. The header shows information showing that it is the data response message. The data request vehicle code is a code for identifying a vehicle mounting a communication device making the data request message, and is included in the acquired data request message. The data response vehicle code is a code for identifying the vehicle mounting the communication device making this message. For example, information described in a number plate of the vehicle is considered as this data response vehicle code. The target zone code is the same as the target zone code included in the acquired data request message. The request data are data corresponding to the request data code included in the acquired data request message, and are acquired from the memory 21, the navigation device 31 or the sensor group 33. The above time is a making time of the data response message. The transfer time number is the remaining time number for transferring the data response message, and is set in S233.

The explanation is returned to FIG. 11 and the data response message made in S235 is subsequently transmitted to all the other communication devices existing in the vicinity through the wireless communication section 13 and the wireless antenna 15 (S237). When this signal transmission is terminated, this processing (data response message transmission processing) is terminated and the processing proceeds to a subsequent step (S225) in the data request message reception-transfer processing as a calling-out source.

(4) Data Response Message Reception-Transfer Processing

Figure 12:
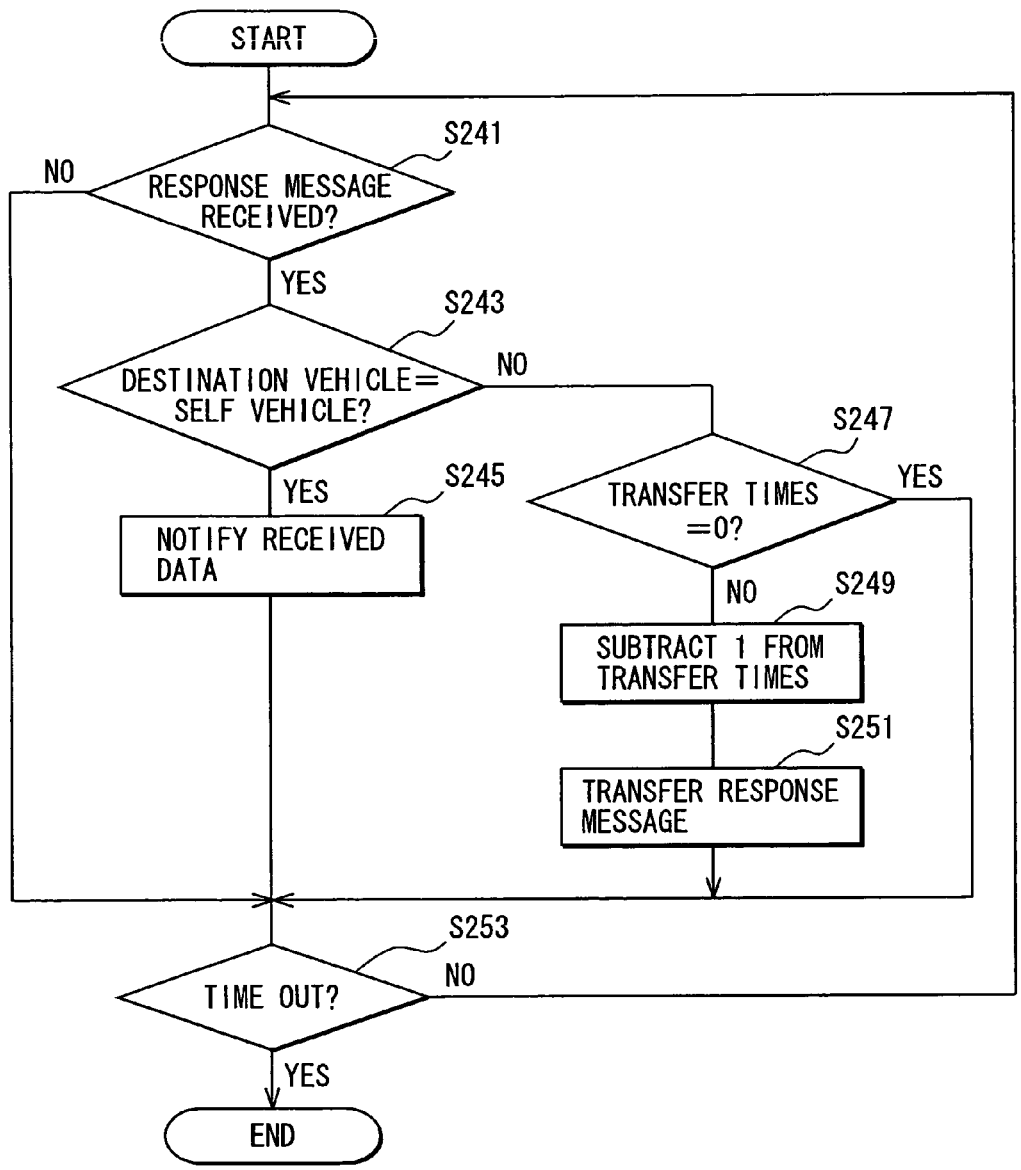
FIG. 12 is a flow chart showing a data response message receiving/transferring process, according to the second embodiment.

Next, data response message reception-transfer processing will be explained by using the flow chart of FIG. 12. This data response message reception-transfer processing is processing beginning to be executed in the CPU 29 in supplying electric power to the communication device 11.

When the execution of the data response message reception-transfer processing is started, the CPU 29 first tries the reception of the data response message from another communication device through the wireless communication section 13, and judges whether the data response message can be received or not (S241). When it is judged that no data response message can be received (S241: No), it proceeds to S253 described later. In contrast to this, when it is judged that the data response message can be received (S241: Yes), it is judged whether the vehicle corresponding to the data request vehicle code included in the received data response message is a self vehicle (the vehicle mounting the communication device 11 thereto) or not (S243).

When it is judged in this S243 that the vehicle corresponding to the data request vehicle code is a self vehicle (S243: Yes), the request data in the received data response message, i.e., traffic information, weather information, etc. are notified (S245). Concretely, this notification is performed by displaying the request data in the display section 25 and outputting the request data to the speaker 27 as a voice. The processing then proceeds to S253.

In contrast to this, when it is judged in S243 that no vehicle corresponding to the data request vehicle code is a self vehicle (S243: No), it is judged whether the value of the transfer time number included in the received data response message is "0" or not (S247).

When it is judged in this S247 that no value of the transfer time number included in the received data response message is "0" (S247: No), the value of the transfer time number is subtracted by one (S249) and this subtracted value is set to the data response message and is transferred to the other communication devices except for the communication device previously performing the signal reception (S251). It then proceeds to S253.

In contrast to this, when it is judged in S247 that the value of the transfer time number included in the received data response message is "0", it proceeds to S253.

In S253, it is judged whether the time from the beginning of the data response message reception-transfer processing exceeds a predetermined time or not. This judgment has the meaning that the data response message reception-transfer processing is normally terminated in a program. When it is desirous to terminate the data response message reception-transfer processing in another processing (program), etc., this processing (program), etc. are realized by rewriting the above predetermined time as e.g., "0".

When it is judged in this S253 that the time from the beginning of the data response message reception-transfer processing exceeds the predetermined time (S253: Yes), this processing (data response message reception-transfer processing) is terminated. In contrast to this, when it is judged that no time from the beginning of the data response message reception-transfer processing exceeds the predetermined time (S253: No), the processing proceeds to the above S241.

The communication device 11 of the second embodiment mode has been explained above. In accordance with the communication device 11 of this embodiment mode, there is no case in which the data request message and the data response message are transferred unlimitedly. Accordingly, the communication amount of the entire system can be reduced.

Third Embodiment Mode

The communication device 11 of a third embodiment mode will next be explained. The construction of the communication device 11 of the third embodiment mode is similar to that of the communication device 11 of the first embodiment mode, and its explanation is therefore omitted.

Various kinds of processings executed by the CPU 29 will be explained.

(1) Data Request Message Transmission Processing

First, data request message transmission processing will be explained by using the flow chart of FIG. 14. This data request message transmission processing begins to be executed when the operating section 23 receives an operation of the command of execution of the data request message transmission processing.

When the execution of the data request message transmission processing is started, the CPU 29 first specifies a target zone (S301). The "zone" said here is generated by dividing a map by predetermined latitude and longitude on the basis of map data acquired from the navigation device 31 by the CPU 29. Concretely, for example, the "zone" means an area of an approximately square shape having one side of about several hundred meters to several kilometers. With respect to a generating technique of this "zone", a similar technique is also used in another communication device and zones of the same shape and number are generated. Further, "specifying" means that the operating section 23 selects and determines one or plural zones on the basis of a receiving command. Concretely, for example, when an operator performs an operation of the command of "it is desirous to acquire traffic information of a XX district", "specifying" is to select a zone corresponding to this XX district and determine this zone as the "target zone".

Subsequently, a message transfer zone is specified (S303). For example, this means that a rectangular zone having an existing zone (hereinafter called a "data request zone") of the data request vehicle and the target zone as vertexes is specified as the message transfer zone and a zone along single or plural roads connecting the target zone from the data request zone is specified as the message transfer zone. In road information, map data arranged in the navigation device 31 are utilized.

Figures 16, 18A, 18B:
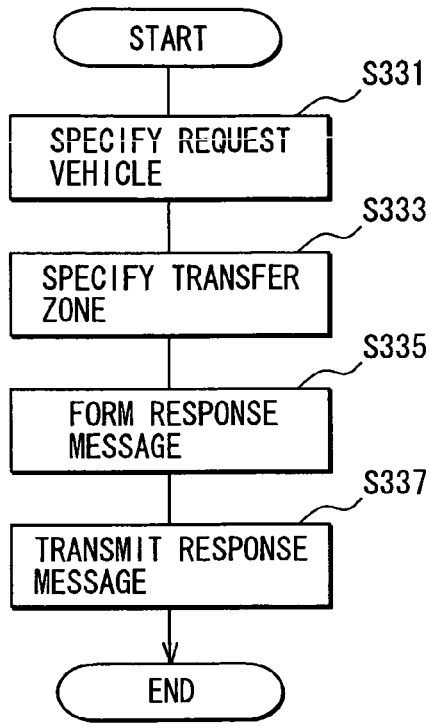
FIG. 16 is a flow chart showing a data response message transmitting process, according to the third embodiment.
FIG. 18A is a chart showing a data request message.
FIG. 18B is a chart showing a data response message, according to the third embodiment.

Subsequently, a data request message is made (S305). A format of this data request message will be explained. As shown in FIG. 18A, the data request message is constructed by a header, a data request vehicle code, a target zone code, a message transfer zone code list, a request data code and time. The header shows information showing that it is the data request message. The data request vehicle code is a code for identifying a vehicle mounting a communication device making this message. For example, information described in a number plate of the vehicle is considered as the data request vehicle code. The target zone code is a code of the target zone specified in S201. This code can be also commonly used in another communication device, and the same code shows the same zone. The message transfer zone code list is a list for specifying the zone of an object for transferring a message, and the code of the message transfer zone specified in S303 is set to a list format. The request data code is a code showing requested data, and is e.g., a code showing traffic information, a code showing weather information, etc. The above time is a making time of the data request message.

The explanation is returned to FIG. 14, and the data request message is subsequently transmitted to all the other communication devices existing in the vicinity through the wireless communication section 13 and the wireless antenna 15 (S307). The communication device receiving this data request message executes the data request message reception-transfer processing explained next.

When the transmission of the data request message is terminated, this processing (data request message transmission processing) is terminated.

(2) Data Request Message Reception-Transfer Processing

Figure 15:
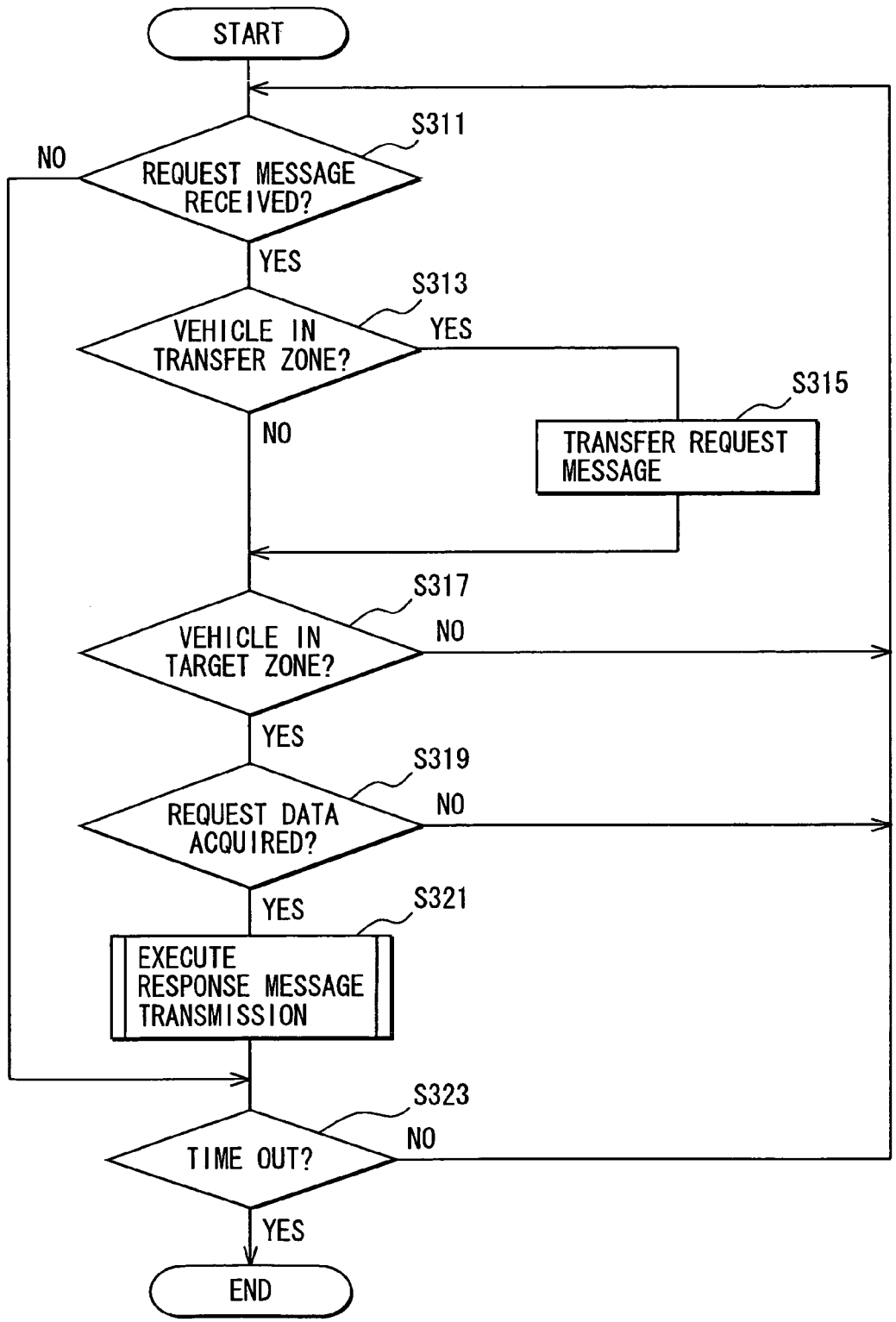
FIG. 15 is a flow chart showing a data request message receiving/transferring process, according to the third embodiment.

Next, the data request message reception-transfer processing will be explained by using the flow chart of FIG. 15. This data request message reception-transfer processing is processing beginning to be executed in the CPU 29 in supplying electric power to the communication device 11.

When the execution of the data request message reception-transfer processing is started, the CPU 29 first tries the reception of the data request message from another communication device through the wireless communication section 13, and judges whether the data request message can be received or not (S311). When it is judged that no data request message can be received (S311: No), it proceeds to S323 described later. In contrast to this, when it is judged that the data request message can be received (S311: Yes), it is judged whether the existing zone of a self vehicle (the vehicle mounting the communication device 11 thereto) is included within the message transfer zone code list included in the received data request message or not (S313). This judgment is made on the basis of a zone generated by dividing a map by predetermined latitude and longitude on the basis of map data acquired from the navigation device 31, and data relating to the present position acquired from the position data acquiring section 17.

When it is judged in this S313 that the existing zone of the self vehicle is included within the message transfer zone code list included in the received data request message (S313: Yes), the received data request message is transferred to the other communication devices except for the communication device previously performing the signal reception (S315). It then proceeds to S317.

In contrast to this, when it is judged that no existing zone of the self vehicle is included within the message transfer zone code list included in the received data request message (S313: No), it proceeds to S317.

In S317, it is judged whether the self vehicle exists in the target zone included in the received data request message or not. When it is judged that no self vehicle exists in the target zone (S317: No), the processing proceeds to the above S311. In contrast to this, when it is judged that the self vehicle exists in the target zone (S317: Yes), it proceeds to S319.

In S319, it is judged whether data (e.g., traffic information, weather information, etc.) corresponding to the request data code included in the received data request message are possessed (or can be acquired) or not. This judgment is made by including data able to be acquired from the navigation device 31 and data able to be acquired from the sensor group 33 in addition to data stored by the memory 21. When it is judged that the data corresponding to the request data code are not possessed (or cannot be acquired) (S319: No), the processing proceeds to the above S311. In contrast to this, when it is judged that the data corresponding to the request data code are possessed (or can be acquired) (S319: Yes), the data request message transmission processing described later is executed (S321). When the data request message transmission processing is terminated, it is judged whether the time from the beginning of the data request message reception-transfer processing exceeds a predetermined time or not (S323). This judgment has the meaning that the data request message reception-transfer processing is normally terminated in a program. When it is desirous to terminate the data request message reception-transfer processing in another processing (program), etc., this processing (program), etc. are realized by rewriting the above predetermined time as e.g., "0".

When it is judged in this S323 that the time from the beginning of the data request message reception-transfer processing exceeds the predetermined time (S323: Yes), this processing (data request message reception-transfer processing) is terminated. In contrast to this, when it is judged that no time from the beginning of the data request message reception-transfer processing exceeds the predetermined time (S323: No), the processing proceeds to the above S311.

(3) Data Response Message Transmission Processing

Next, data response message transmission processing will be explained by using the flow chart of FIG. 16. This data response message transmission processing is processing called out and executed in S321 of the above data request message reception-transfer processing.

When the data response message transmission processing is started, the CPU 29 first specifies a data request vehicle (S331). This specifying is performed by extracting the data request vehicle code included in the data request message acquired in the data request message reception-transfer processing.

Subsequently, a message transfer zone is specified (S333). This specifying is performed by extracting the message transfer zone code list included in the data request message acquired in the data request message reception-transfer processing.

Subsequently, a data response message is made (S335). This making is to acquire data corresponding to the request data code included in the data request message acquired in the data request message reception-transfer processing from the memory 21, the navigation device 31 or the sensor group 33, and construct the data response message in accordance with a format. Here, the format of the data response message will be explained. As shown in FIG. 18B, the data response message is constructed by a header, a data request vehicle code, a data response vehicle code, a target zone code, a message transfer zone code list, request data and time. The header shows information showing that it is the data request message. The data request vehicle code is a code for identifying a vehicle mounting a communication device making the data request message, and is included in the acquired data request message. The data response vehicle code is a code for identifying the vehicle mounting the communication device making this message. For example, information described in a number plate of the vehicle is considered as the data response vehicle code. The target zone code is the same as the target zone code included in the acquired data request message. The message transfer zone code list is a list for specifying the zone of an object for transferring a message, and the code of the message transfer zone specified in S335 is set to a list format. The request data are data corresponding to the request data code included in the acquired data request message, and are acquired from the memory 21, the navigation device 31 or the sensor group 33. The above time is a making time of the data response message.

The explanation is returned to FIG. 16 and the data response message made in S335 is subsequently transmitted to all the other communication devices existing in the vicinity through the wireless communication section 13 and the wireless antenna 15 (S337). When the signal transmission is terminated, this processing (data response message transmission processing) is terminated and the processing proceeds to a subsequent step (S323) in the data request message reception-transfer processing as a calling-out source.

(4) Data Response Message Reception-Transfer Processing

Figure 17:
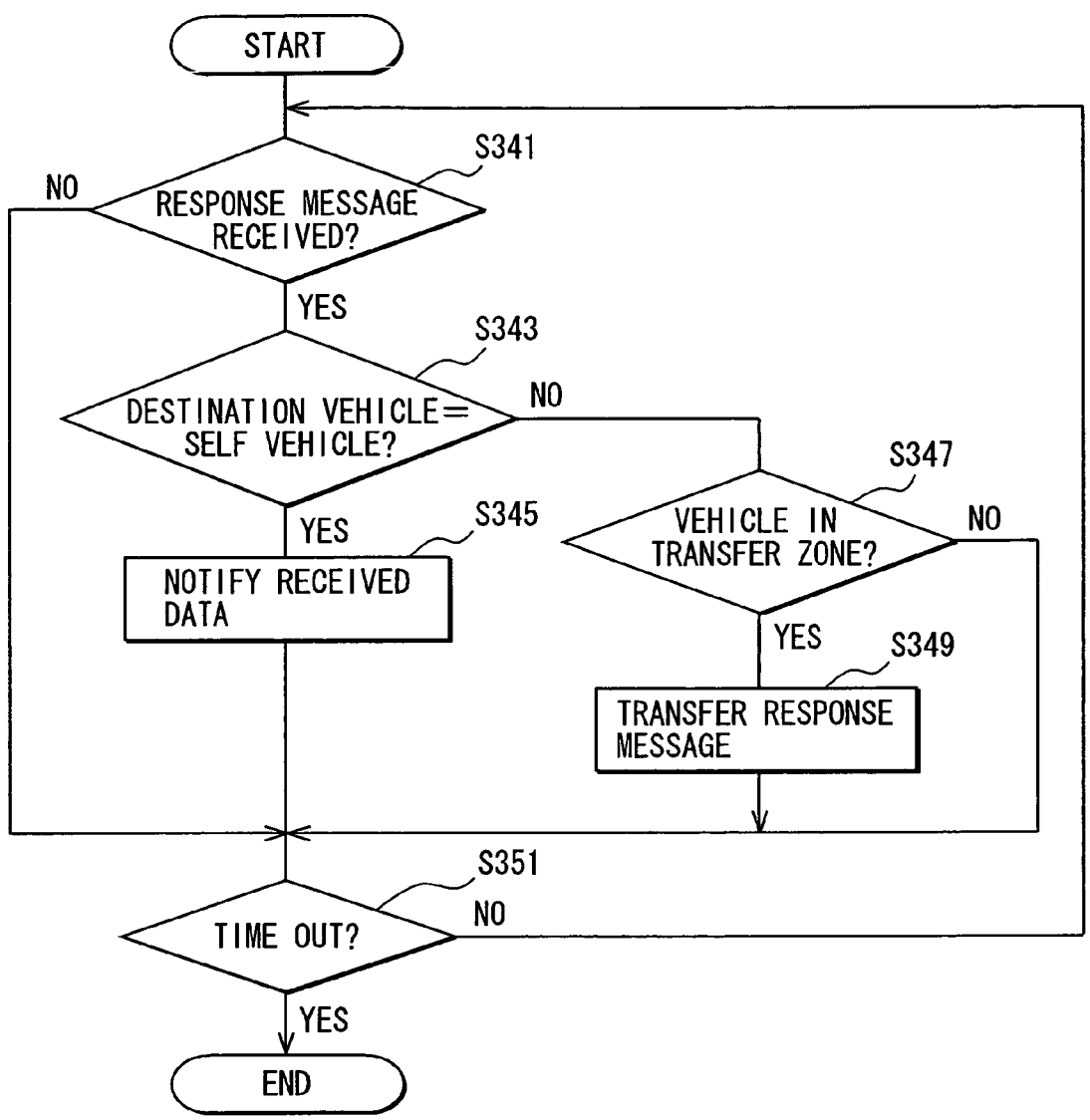
FIG. 17 is a flow chart showing a data response message receiving/transferring process, according to the third embodiment.

Next, data response message reception-transfer processing will be explained by using the flow chart of FIG. 17. This data response message reception-transfer processing is processing beginning to be executed in the CPU 29 in supplying electric power to the communication device 11.

When the execution of the data response message reception-transfer processing is started, the CPU 29 first tries the reception of the data response message from another communication device through the wireless communication section 13, and judges whether the data response message can be received or not (S341). When it is judged that no data response message can be received (S341: No), it proceeds to S351 described later. In contrast to this, when it is judged that the data response message can be received (S341: Yes), it is judged whether the vehicle corresponding to the data request vehicle code included in the received data response message is a self vehicle (the vehicle mounting the communication device 11 thereto) or not (S343).

When it is judged in this S343 that the vehicle corresponding to the data request vehicle code is a self vehicle (S343: Yes), the request data in the received data response message, i.e., traffic information, weather information, etc. are notified (S345). Concretely, this notification is performed by displaying the request data in the display section 25 and outputting the request data to the speaker 27 as a voice. The processing then proceeds to S351.

In contrast to this, when it is judged in S343 that no vehicle corresponding to the data request vehicle code is a self vehicle (S343: No), it is judged whether an existing zone of the self vehicle (the vehicle mounting the communication device 11 thereto) is included within the message transfer zone code list included in the received data response message or not (S347). This judgment is made by specifying the existing zone of the self vehicle on the basis of the zone generated by dividing a map by predetermined latitude and longitude on the basis of data relating to the present position acquired from the position data acquiring section 17, and map data acquired from the navigation device 31.

When it is judged in this S347 that the existing zone of the self vehicle is included within the message transfer zone code list included in the received data response message (S347: Yes), the received data response message is transferred to the other communication devices except for the communication device previously performing the signal reception (S349). It then proceeds to S351.

In contrast to this, when it is judged in S347 that no existing zone of the self vehicle is included within the message transfer zone code list included in the received data response message (S347: No), it proceeds to S351.

In S351, it is judged whether the time from the beginning of the data response message reception-transfer processing exceeds a predetermined time or not. This judgment has the meaning that the data response message reception-transfer processing is normally terminated in a program. When it is desirous to terminate the data response message reception-transfer processing in another processing (program), etc., this processing (program), etc. are realized by rewriting the above predetermined time as e.g., "0".

When it is judged in this S351 that the time from the beginning of the data response message reception-transfer processing exceeds the predetermined time (S351: Yes), this processing (data response message reception-transfer processing) is terminated. In contrast to this, when it is judged that no time from the beginning of the data response message reception-transfer processing exceeds the predetermined time (S351: No), the processing proceeds to the above S341.

Figure 19:
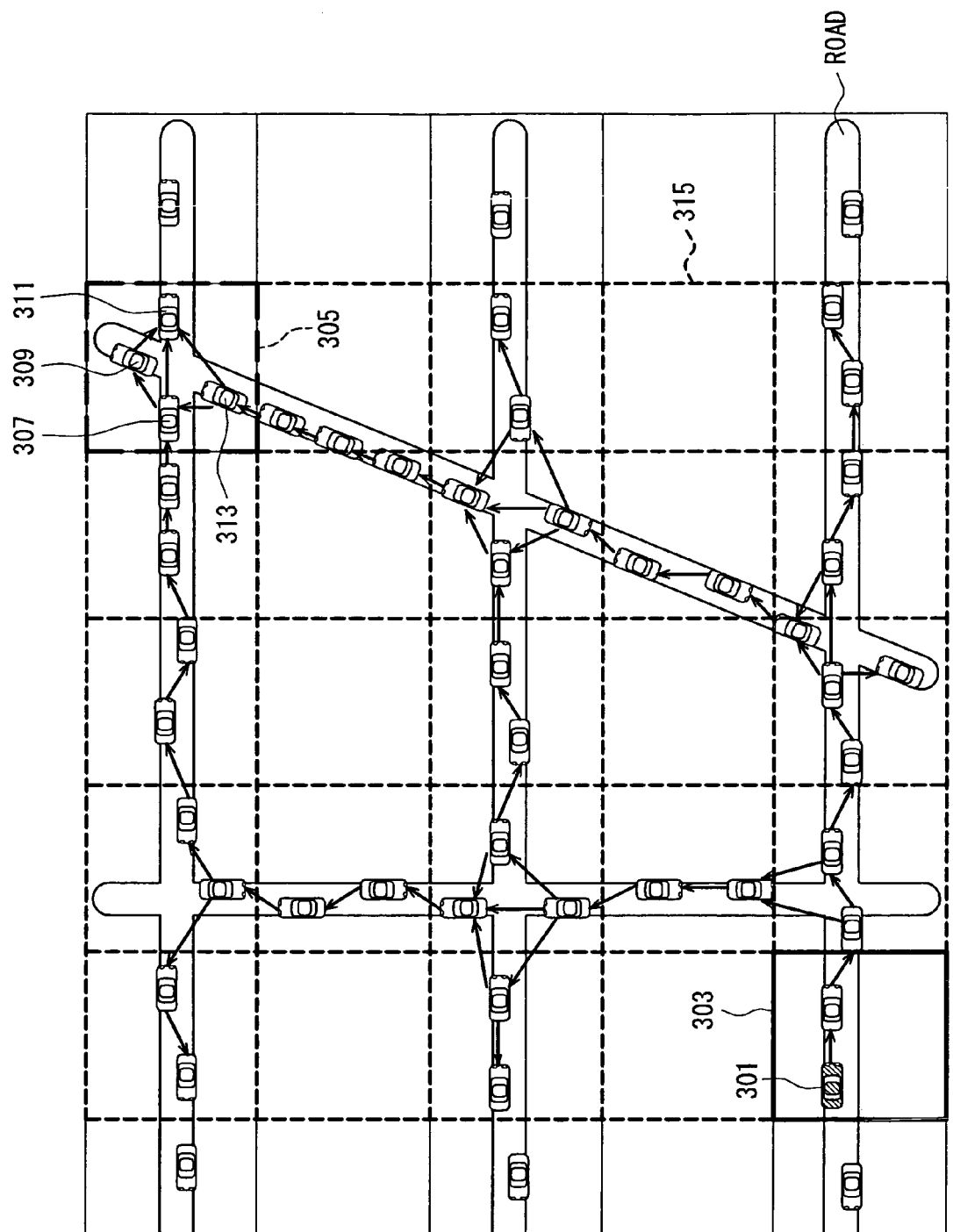
FIG. 19 is a map explaining a method for transferring a data request message, according to the third embodiment.

Here, one example of a transferring situation of the data request message will be explained by using the explanatory view of FIG. 19. FIG. 19 shows a map divided into zones of 7×5 measures, and each vehicle mounting the communication device 11 thereto is running a road. In the communication device 11 mounted to a data request vehicle 301, it is now supposed that a data request zone 303 (thick solid line) and a target zone 305 (coarse broken line) are specified. Thus, a rectangular zone having the data request zone 303 and the target zone 305 as vertexes is specified as a message transfer zone 315 (thin broken line). When the message transfer zone 315 is specified, a data request message including its information is made and transmitted to the communication device 11 mounted to a vehicle adjacent to the data request vehicle 301. Thus, in the communication device 11 mounted to the vehicle adjacent to the data request vehicle 301, the data request message reception-transfer processing is executed and the existence of transfer is judged on the basis of the message transfer zone code list included in the data request message, and the data request message is transferred. Namely, only the communication device 11 of the vehicle existing within the message transfer zone 315 transfers the data request message, and the transfer of the data request message proceeds. The data request message is also transferred to vehicles 307 to 313 existing in the target zone 305, and the data response message transmission processing is executed in the communication device 11 mounted to each vehicle. With respect to the data response message, only the communication device 11 of the vehicle existing within the message transfer zone 315 similarly transfers the data response message, and the data response message is finally transferred until the data request vehicle 301.

Figure 20:
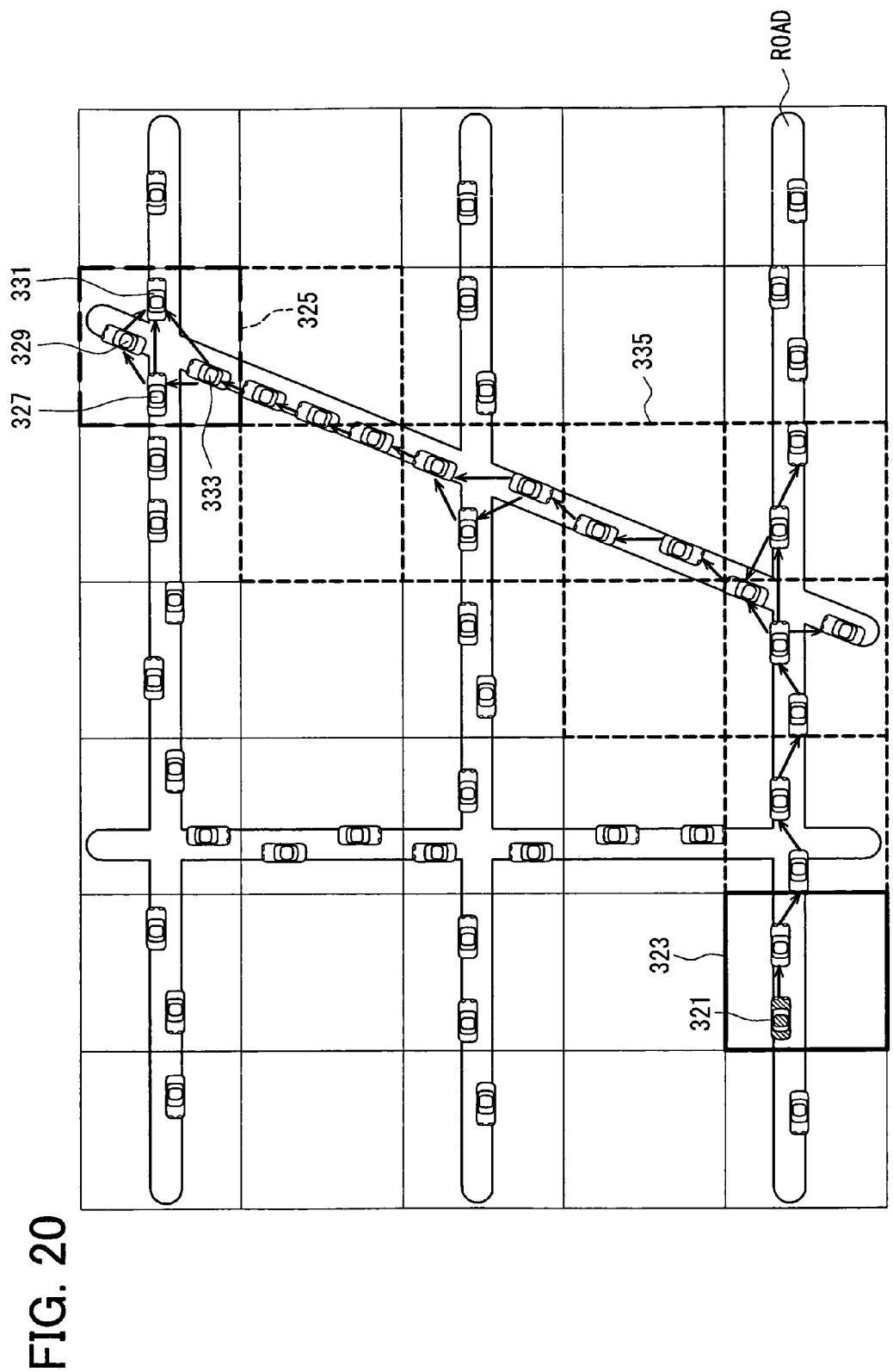
FIG. 20 is a map explaining a method for transferring a data request message, according to the first embodiment.

Next, a specifying case of the message transfer zone of a separate shape will be explained by using the explanatory view of FIG. 20. FIG. 20 shows a map divided into zones of 7×5 measures, and each vehicle mounting the communication device 11 thereto is running a road. In the communication device 11 mounted to a data request vehicle 321, it is now supposed that a data request zone 323 (thick solid line) and a target zone 325 (coarse broken line) are specified. Thus, a zone along single or plural roads connecting the data request zone 323 and the target zone 325 is specified as a message transfer zone 335 (thin broken line). When the message transfer zone 335 is specified, a data request message including its information is made and transmitted to the communication device 11 mounted to a vehicle adjacent to the data request vehicle 321. Thus, in the communication device 11 mounted to the vehicle adjacent to the data request vehicle 321, the data request message reception-transfer processing is executed. The existence of transfer is then judged on the basis of the message transfer zone code list included in the data request message, and the data request message is transferred. Namely, only the communication device 11 of the vehicle existing within the message transfer zone 335 transfers the data request message, and the transfer of the data request message proceeds. The data request message is also transferred to vehicles 327 to 333 existing within the target zone 325, and the data response message transmission processing is executed in the communication device 11 mounted to each vehicle. With respect to the data response message, only the communication device 11 of the vehicle existing within the message transfer zone 335 similarly transfers the data response message, and the data response message is finally transferred to the data request vehicle 321.

The communication device 11 of the third embodiment mode has been explained above. In accordance with the communication device 11 of this embodiment mode, a message is transferred in only the zone of high value in transferring the message when information of an object is obtained. Therefore, the effect of reducing the communication amount of the entire system is obtained.

Fourth Embodiment Mode

The communication device 11 of a fourth embodiment mode will next be explained. The construction of the communication device 11 of the fourth embodiment mode is similar to that of the communication device 11 of the first embodiment mode, and its explanation is therefore omitted.

Various kinds of processings executed by the CPU 29 will be explained.

(1) Data Request Message Transmission Processing

First, data request message transmission processing will be explained, but is basically similar to the data request message transmission processing in the communication device 11 of the above first embodiment mode, and its detailed explanation is therefore omitted. The data request message transmission processing according to the first embodiment mode is shown in FIG. 2. The difference point between this data request message transmission processing and the data request message transmission processing of the first embodiment mode is that the format of the data request message made in S103 is different.

Figures 23A, 23B, 25:
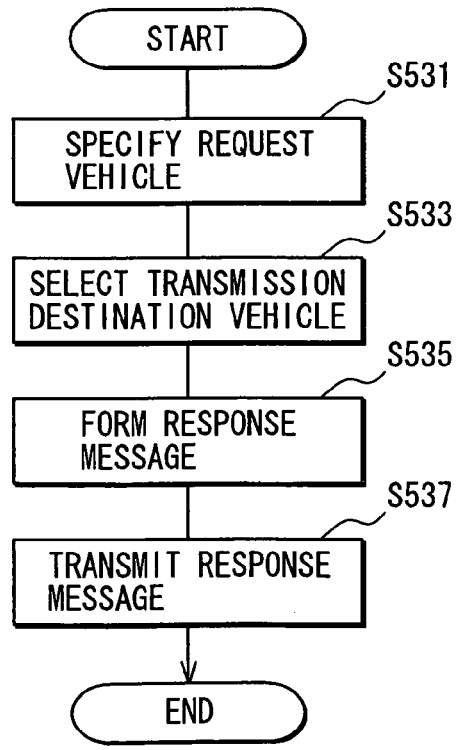
FIG. 23A is a chart showing a data request message.
FIG. 23B is a chart showing a data response message, according to the fourth embodiment.
FIG. 25 is a flow chart showing a data response message transmitting process, according to the fifth embodiment.

This format will be explained by using the explanatory view of the format of FIG. 23A. The data request message is constructed by a header, a data request vehicle code, a data request zone code, a target zone code, a request data code and time. The header shows information showing that it is the data request message. The data request vehicle code is a code for identifying a vehicle mounting a communication device making this message. For example, information described in a number plate of the vehicle is considered as this data request vehicle code. The data request zone code shows a zone in which a data request vehicle exists. The target zone code is a code of the target zone specified in S101. This code can be also commonly used in another communication device, and the same code shows the same zone. The request data code is a code showing requested data and is e.g., a code showing traffic information, a code showing weather information, etc. The above time is a making time of the data request message.

The data request message of such a format is made in S103, and is transmitted to all the other communication devices existing in the vicinity in S105. The communication device receiving this data request message executes the data request message reception-transfer processing explained next.

(2) Data Request Message Reception-Transfer Processing

Figure 21:
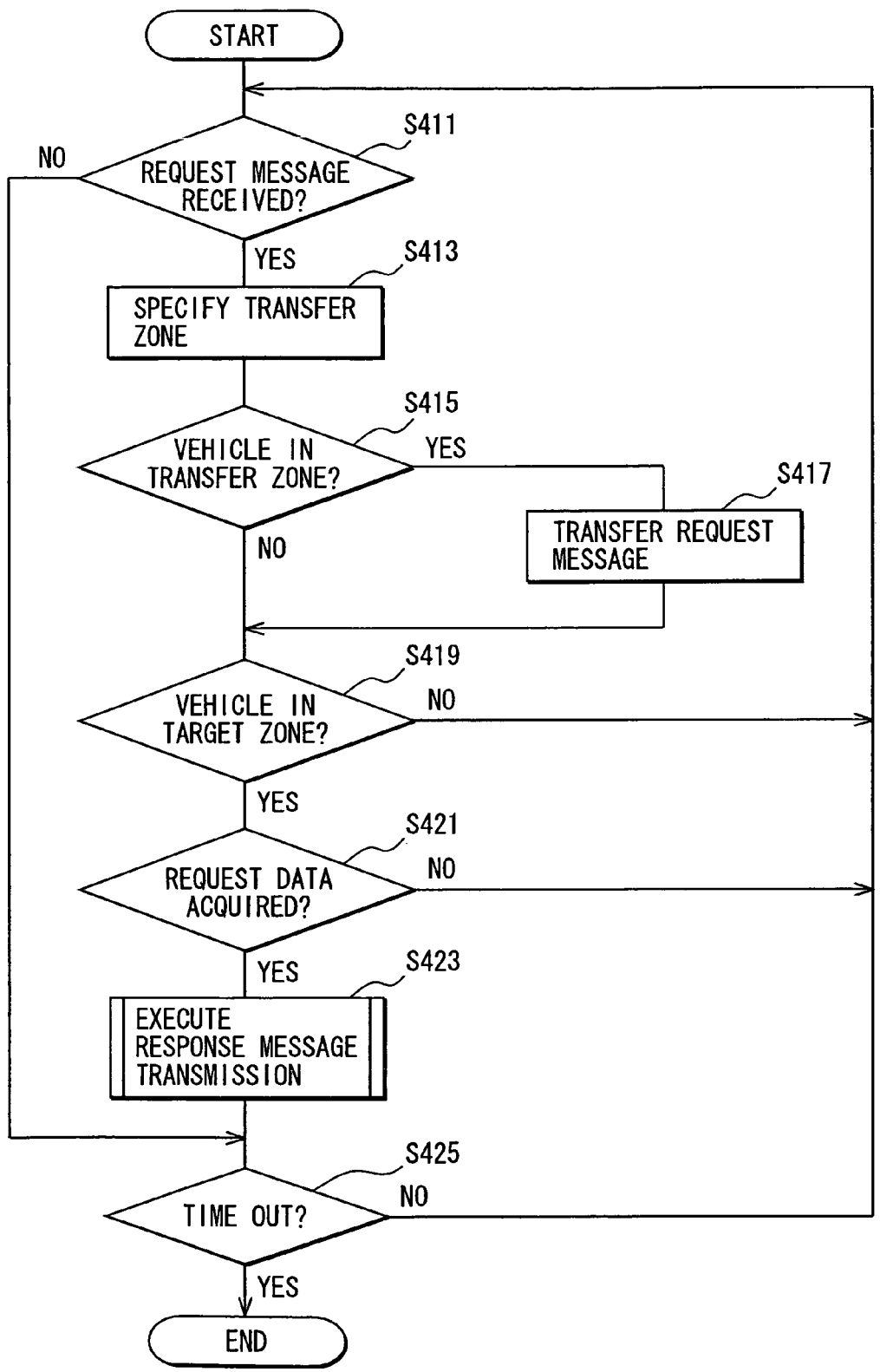
FIG. 21 is a flow chart showing a data request message receiving/transferring process, according to a fourth embodiment of the present invention.

Next, data request message reception-transfer processing will be explained by using the flow chart of FIG. 21. This data request message reception-transfer processing is processing beginning to be executed in the CPU 29 in supplying electric power to the communication device 11.

When the execution of the data request message reception-transfer processing is started, the CPU 29 first tries the reception of the data request message from another communication device through the wireless communication section 13, and judges whether the data request message can be received or not (S411). When it is judged that no data request message can be received (S411: No), it proceeds to S425 described later. In contrast to this, when it is judged that the data request message can be received (S411: Yes), a message transfer zone is specified on the basis of the data request zone included in the received data request message and the target zone (S413). For example, this means that a rectangular zone having the data request zone and the target zone as vertexes is specified as the message transfer zone, and a zone along single or plural roads connecting the target zone from the data request zone is specified as the message transfer zone. Road information is obtained by utilizing map data arranged in the navigation device 31.

In subsequent S415, it is judged whether the existing zone of a self vehicle (the vehicle mounting the communication device 11 thereto) is included within the message transfer zone specified in S413 or not.

When it is judged in this S415 that the existing zone of the self vehicle is included within the message transfer zone specified in S413 (S415: Yes), the received data request message is transferred to the other communication devices except for the communication device previously performing the signal reception (S417). It then proceeds to S419.

In contrast to this, when it is judged in S415 that no existing zone of the self vehicle is included within the message transfer zone specified in S413 (S415: No), it proceeds to S419.

In S419, it is judged whether the self vehicle exists in the target zone included in the received data request message or not. When it is judged that no self vehicle exists in the target zone (S419: No), the processing proceeds to the above S411. In contrast to this, when it is judged that the self vehicle exists in the target zone (S419: Yes), it proceeds to S421.

In S421, it is judged whether data (e.g., traffic information, weather information, etc.) corresponding to the request data code included in the received data request message are possessed (or can be acquired) or not. This judgment is made by including data able to be acquired from the navigation device 31 and data able to be acquired from the sensor group 33 in addition to data stored by the memory 21. When it is judged that the data corresponding to the request data code are not possessed (or cannot be acquired) (S421: No), the processing proceeds to the above S411. In contrast to this, when it is judged that the data corresponding to the request data code are possessed (or can be acquired) (S421: Yes), the data request message transmission processing described later is executed (S423). When the data request message transmission processing is terminated, it is judged whether the time from the beginning of the data request message reception-transfer processing exceeds a predetermined time or not (S425). This judgment has the meaning that the data request message reception-transfer processing is normally terminated in a program. When it is desirous to terminate the data request message reception-transfer processing in another processing (program), etc., this processing (program), etc. are realized by rewriting the above predetermined time as e.g., "0".

When it is judged in this S425 that the time from the beginning of the data request message reception-transfer processing exceeds the predetermined time (S425: Yes), this processing (data request message reception-transfer processing) is terminated. In contrast to this, when it is judged that no time from the beginning of the data request message reception-transfer processing exceeds the predetermined time (S425: No), the processing proceeds to the above S411.

(3) Data Response Message Transmission Processing

Next, data response message transmission processing will be explained, but is basically similar to the data response message transmission processing in the communication device 11 of the above first embodiment mode, and its detailed explanation is therefore omitted. The data response message transmission processing according to the first embodiment mode is shown in FIG. 4. The difference point between this data response message transmission processing and the data response message transmission processing of the first embodiment mode is that the format of a data transmission message made in S133 is different.

This format will be explained by using the explanatory view of the format of FIG. 23B. The data transmission message is constructed by a header, a data request vehicle code, a data response vehicle code, a data request zone code, a target zone code, request data and time. The header shows information showing that it is the data response message. The data request vehicle code is a code for identifying a vehicle mounting a communication device making a data request message, and is included in the acquired data request message. The data response vehicle code is a code for identifying the vehicle mounting the communication device making this message. For example, information described in a number plate of the vehicle is considered as this data response vehicle code. The data request zone code is the same code as the data request zone included in the acquired data request message. The target zone code is the same as the target zone code included in the acquired data request message. The request data are data corresponding to the request data code included in the acquired data request message, and are acquired from the memory 21, the navigation device 31 or the sensor group 33. The above time is a making time of the data response message.

The data response message of such a format is made in S133, and is transmitted to all the other communication devices existing in the vicinity in S135. The communication device receiving this data response message executes the data response message reception-transfer processing explained next.

(4) Data Response Message Reception-Transfer Processing

Figure 22:
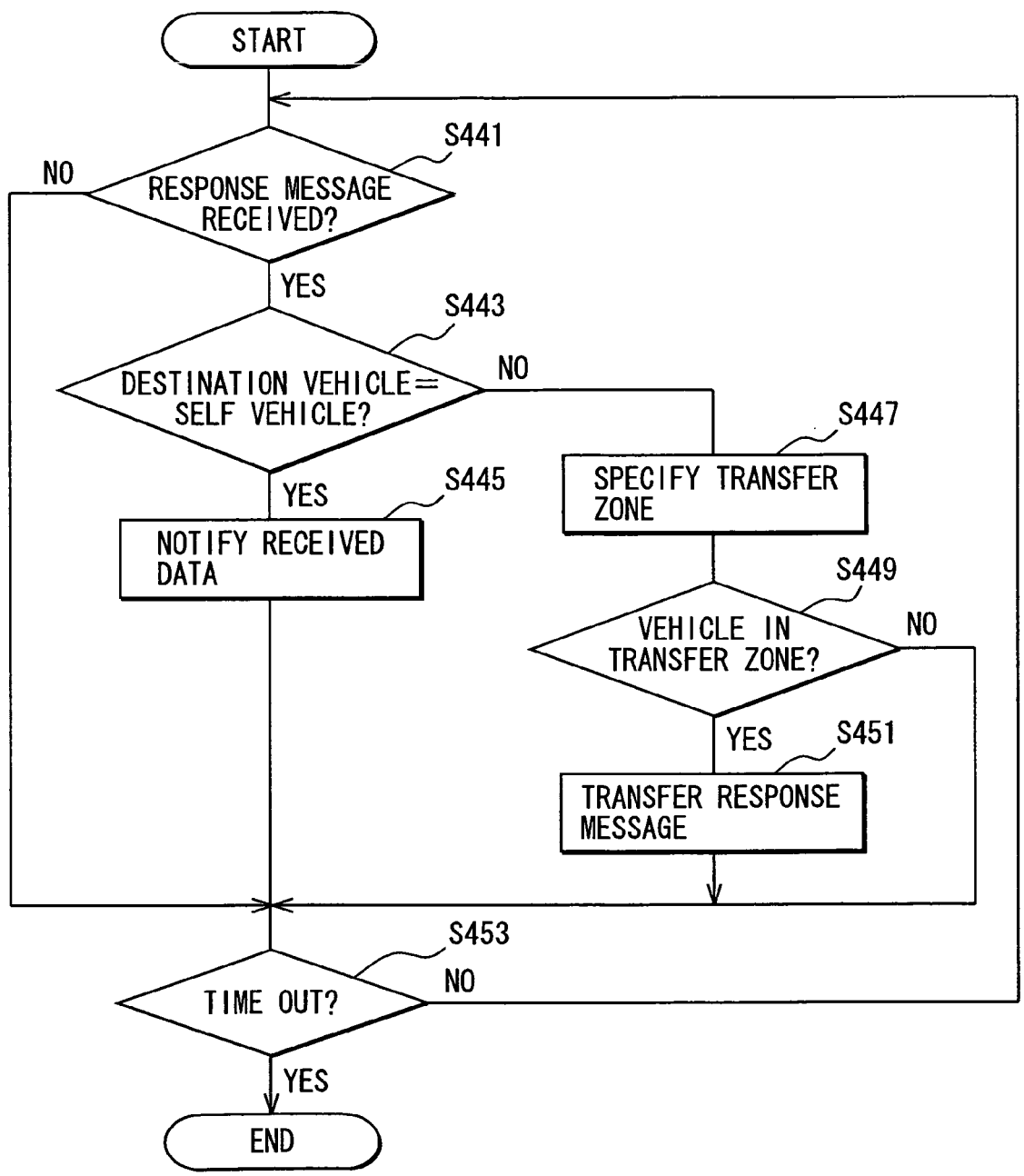
FIG. 22 is a flow chart showing a data response message receiving/transferring process, according to the fourth embodiment.

Next, data response message reception-transfer processing will be explained by using the flow chart of FIG. 22. This data response message reception-transfer processing is processing beginning to be executed in the CPU 29 in supplying electric power to the communication device 11.

When the execution of the data response message reception-transfer processing is started, the CPU 29 first tries the reception of the data response message from another communication device through the wireless communication section 13, and judges whether the data response message can be received or not (S441). When it is judged that no data response message can be received (S441: No), it proceeds to S453 described later. In contrast to this, when it is judged that the data response message can be received (S441: Yes), it is judged whether the vehicle corresponding to the data request vehicle code included in the received data response message is a self vehicle (the vehicle mounting the communication device 11 thereto) or not (S443).

When it is judged in this S443 that the vehicle corresponding to the data request vehicle code is a self vehicle (S443: Yes), the request data in the received data response message, i.e., traffic information, weather information, etc. are notified (S445). Concretely, this notification is performed by displaying the request data in the display section 25 and outputting the request data to the speaker 27 as a voice. The processing then proceeds to S453.

In contrast to this, when it is judged in S443 that no vehicle corresponding to the data request vehicle code is a self vehicle (S443: No), a message transfer zone is specified on the basis of the data request zone included in the received data response message and the target zone (S447). For example, this specifying means that a rectangular zone having the data request zone and the target zone as vertexes is specified as the message transfer zone, and a zone along single or plural roads connecting the target zone from the data request zone is specified as the message transfer zone. Road information is obtained by utilizing map data arranged in the navigation device 31.

In subsequent S449, it is judged whether the existing zone of the self vehicle is included within the message transfer zone specified in S447 or not.

When it is judged in this S449 that the existing zone of the self vehicle is included within the message transfer zone specified in S447 (S449: Yes), the received data response message is transferred to the other communication devices except for the communication device previously performing the signal reception (S451). It then proceeds to S453.

In contrast to this, when it is judged in S449 that no existing zone of the self vehicle is included within the message transfer zone specified in S447 (S449: No), it proceeds to S453.

In S453, it is judged whether the time from the beginning of the data response message reception-transfer processing exceeds a predetermined time or not. This judgment has the meaning that the data response message reception-transfer processing is normally terminated in a program. When it is desirous to terminate the data response message reception-transfer processing in another processing (program), etc., this processing (program), etc. are realized by rewriting the above predetermined time as e.g., "0".

When it is judged in this S453 that the time from the beginning of the data response message reception-transfer processing exceeds the predetermined time (S453: Yes), this processing (data response message reception-transfer processing) is terminated. In contrast to this, when it is judged that no time from the beginning of the data response message reception-transfer processing exceeds the predetermined time (S453: No), the processing proceeds to the above S441.

The communication device 11 of the fourth embodiment mode has been explained above. In accordance with the communication device 11 of this embodiment mode, the message transfer zone is specified in the communication device for transferring a message, and the existence of transfer is judged. Namely, the transfer is performed in only the communication device existing in the message transfer zone similar to that in the case of the above third embodiment mode, and an effect similar to that in the case of the above third embodiment mode is obtained.

Fifth Embodiment Mode

The communication device 11 of a fifth embodiment mode will next be explained. The construction of the communication device 11 of the fifth embodiment mode is similar to that of the communication device 11 of the first embodiment mode, and its explanation is therefore omitted.

Various kinds of processings executed by the CPU 29 will be explained.

(1) Data Request Message Transmission Processing

First, data request message transmission processing will be explained, but is basically similar to the data request message transmission processing in the communication device 11 of the above first embodiment mode. Therefore, its detailed explanation is omitted. The data request message transmission processing according to the first embodiment mode is shown in FIG. 2. When a data request message is transmitted to all the other communication devices existing in the vicinity by this data request message transmission processing, data request message reception-transfer processing explained next is started in the communication device receiving the data request message.

(2) Data Request Message Reception-Transfer Processing

Figure 24:
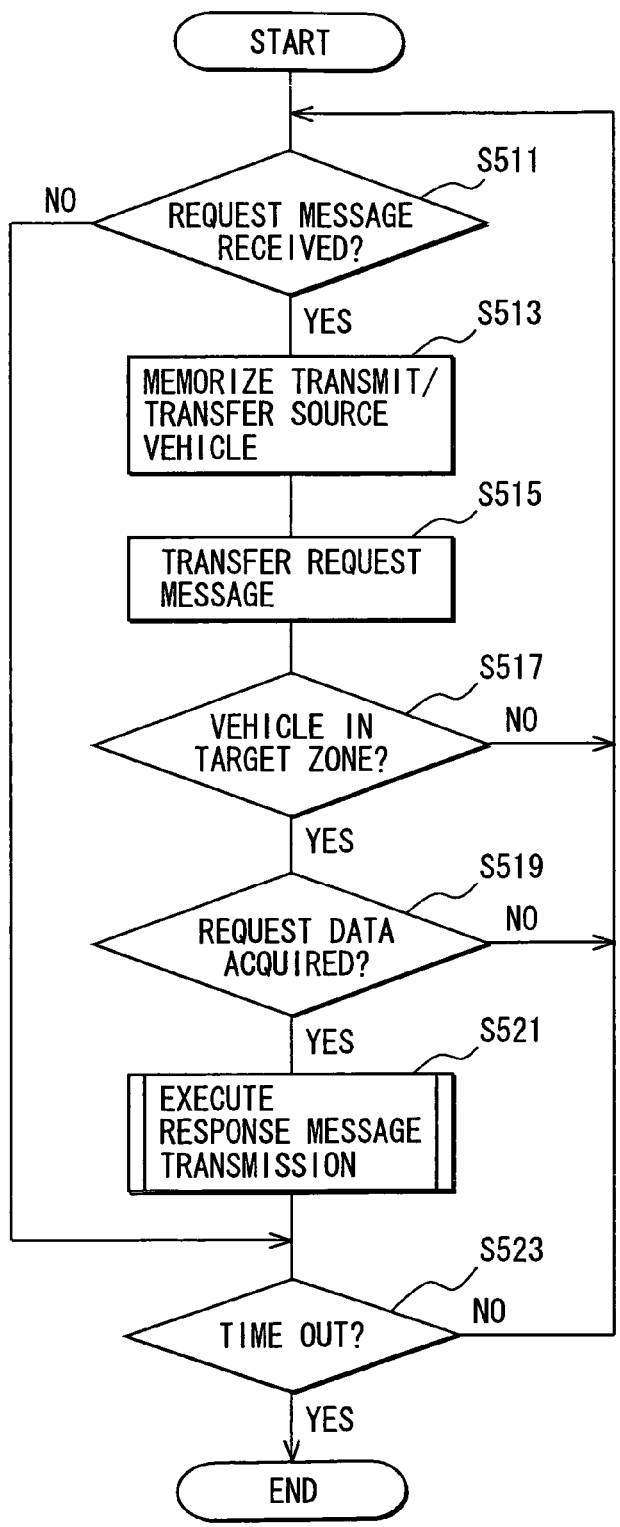
FIG. 24 is a flow chart showing a data request message receiving/transferring process, according to a fifth embodiment of the present invention.

Next, the data request message reception-transfer processing will be explained by using the flow chart of FIG. 24. This data request message reception-transfer processing is processing beginning to be executed in the CPU 29 in supplying electric power to the communication device 11.

When the execution of the data request message reception-transfer processing is started, the CPU 29 first tries the reception of the data request message from another communication device through the wireless communication section 13, and judges whether the data request message can be received or not (S511). When it is judged that no data request message can be received (S511: No), it proceeds to S523 described later. In contrast to this, when it is judged that the data request message can be received (S511: Yes), information relating to a vehicle transmitting and transferring the data request message is stored to the memory 21 (S513). As a concrete example of this information, information described in a number plate of the vehicle, information able to univocally discriminate the communication device 11, etc. are considered.

In subsequent S515, the received data request message is transferred to the other communication devices except for the communication device previously performing the signal reception.

In subsequent S517, it is judged whether a self vehicle exists in the target zone included in the received data request message or not. When it is judged that no self vehicle exists in the target zone (S517: No), the processing proceeds to the above S511. In contrast to this, when it is judged that the self vehicle exists in the target zone (S517: Yes), it proceeds to S519.

In S519, it is judged whether data (e.g., traffic information, weather information, etc.) corresponding to the request data code included in the received data request message are possessed (or can be acquired) or not. This judgment is made by including data able to be acquired from the navigation device 31 and data able to be acquired from the sensor group 33 in addition to data stored by the memory 21 at present. When it is judged that the data corresponding to the request data code are not possessed (or cannot be acquired) (S519: No), the processing proceeds to the above S511. In contrast to this, when it is judged that the data corresponding to the request data code are possessed (or can be acquired) (S519: Yes), the data request message transmission processing described later is executed (S521). When the data request message transmission processing is terminated, it is judged whether the time from the beginning of the data request message reception-transfer processing exceeds a predetermined time or not (S523). This judgment has the meaning that the data request message reception-transfer processing is normally terminated in a program. When it is desirous to terminate the data request message reception-transfer processing in another processing (program), etc., this processing (program), etc. are realized by rewriting the above predetermined time as e.g., "0".

When it is judged in this S523 that the time from the beginning of the data request message reception-transfer processing exceeds the predetermined time (S523: Yes), this processing (data request message reception-transfer processing) is terminated. In contrast to this, when it is judged that no time from the beginning of the data request message reception-transfer processing exceeds the predetermined time (S523: No), the processing proceeds to the above S511.

(3) Data Response Message Transmission Processing

Next, data response message transmission processing will be explained by using the flow chart of FIG. 25. This data response message transmission processing is processing called out and executed in S521 of the above data request message reception-transfer processing.

When the data response message transmission processing is started, the CPU 29 first specifies a data request vehicle (S531). This specifying is performed by extracting the data request vehicle code included in the data request message acquired in the data request message reception-transfer processing.

Subsequently, information relating to a vehicle transmitting and transferring the data request message from the memory 21 is read out, and a transmission destination vehicle of the message is selected (S533).

Subsequently, a data response message is made (S533). This making is to acquire data corresponding to the request data code included in the data request message acquired in the data request message reception-transfer processing from the memory 21, the navigation device 31 or the sensor group 33, and construct the data response message in accordance with a format. The format of this data response message is the same as the format of the above first embodiment mode.

Subsequently, the data response message made in S535 is transmitted to the communication device mounted to the transmission destination vehicle selected in S533 through the wireless communication section 13 and the wireless antenna 19 (S537). When the signal transmission is terminated, this processing (data response message transmission processing) is terminated, and the processing proceeds to a subsequent step (S521) in the data request message reception-transfer processing as a calling-out source.

(4) Data Response Message Reception-Transfer Processing

Figure 26:
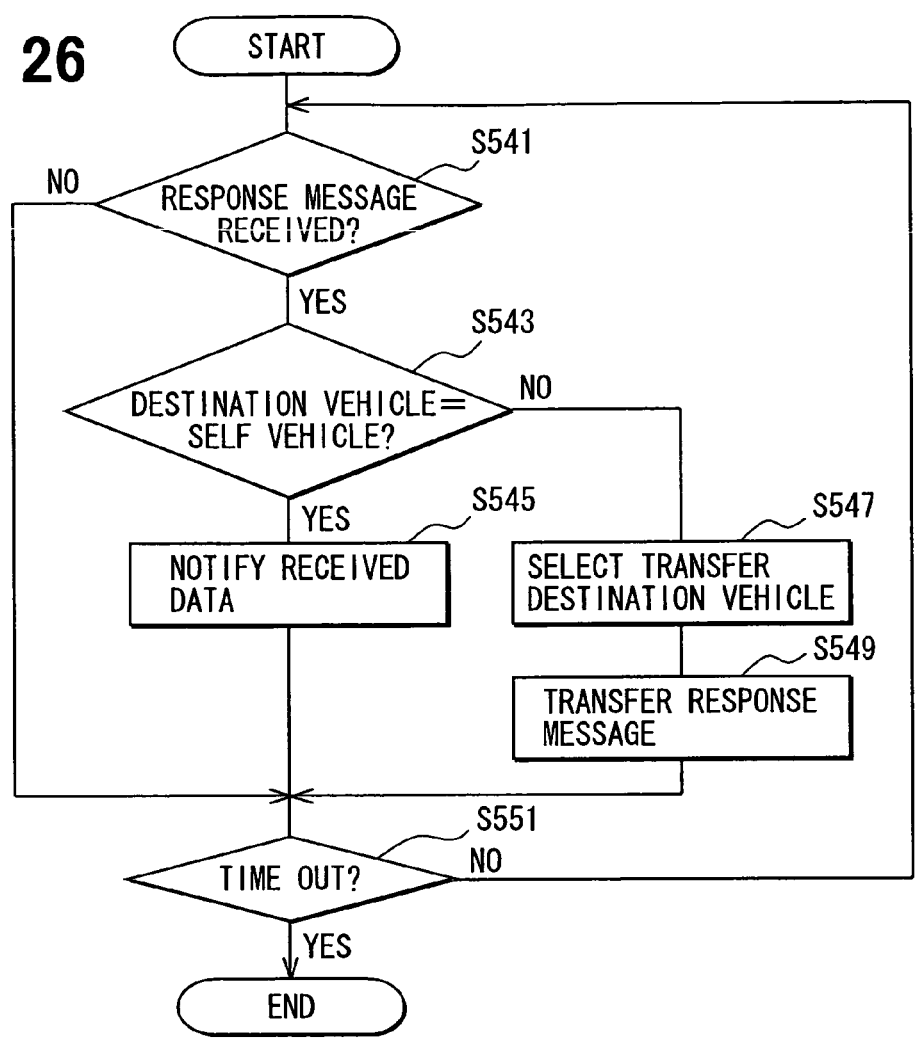
FIG. 26 is a flow chart showing a data response message receiving/transferring process, according to the fifth embodiment.

Next, data response message reception-transfer processing will be explained by using the flow chart of FIG. 26. This data response message reception-transfer processing is processing beginning to be executed in the CPU 29 in supplying electric power to the communication device 11.

When the execution of the data response message reception-transfer processing is started, the CPU 29 first tries the reception of the data response message from another communication device through the wireless communication section 13, and judges whether the data response message can be received or not (S541). When it is judged that no data response message can be received (S541: No), it proceeds to S551 described later. In contrast to this, when it is judged that the data response message can be received (S541: Yes), it is judged whether a vehicle corresponding to the data request vehicle code included in the received data response message is a self vehicle (the vehicle mounting the communication device 11 thereto) or not (S543).

When it is judged in this S543 that the vehicle corresponding to the data request vehicle code is a self vehicle (S543: Yes), request data in the received data response message, i.e., traffic information, weather information, etc. are notified (S545). Concretely, this notification is performed by displaying the request data in the display section 25, and outputting the request data to the speaker 27 as a voice. The processing then proceeds to S551.

In contrast to this, when it is judged in S543 that no vehicle corresponding to the data request vehicle code is a self vehicle (S543: No), information relating to the vehicle transmitting and transferring the data request message is read out of the memory 21, and a transfer destination vehicle of the message is selected (S547).

In subsequent S549, the received data request message is transferred to the communication device mounted to the transfer destination vehicle selected in S547 (S549). It then proceeds to S551.

In S551, it is judged whether the time from the beginning of the data response message reception-transfer processing exceeds a predetermined time or not. This judgment has the meaning that the data response message reception-transfer processing is normally terminated in a program. When it is desirous to terminate the data response message reception-transfer processing in another processing (program), etc., this processing (program), etc. are realized by rewriting the above predetermined time as e.g., "0".

When it is judged in this S551 that the time from the beginning of the data response message reception-transfer processing exceeds the predetermined time (S551: Yes), this processing (data response message reception-transfer processing) is terminated. In contrast to this, when it is judged that no time from the beginning of the data response message reception-transfer processing exceeds the predetermined time (S551: No), the processing proceeds to the above S541.

Figure 27:
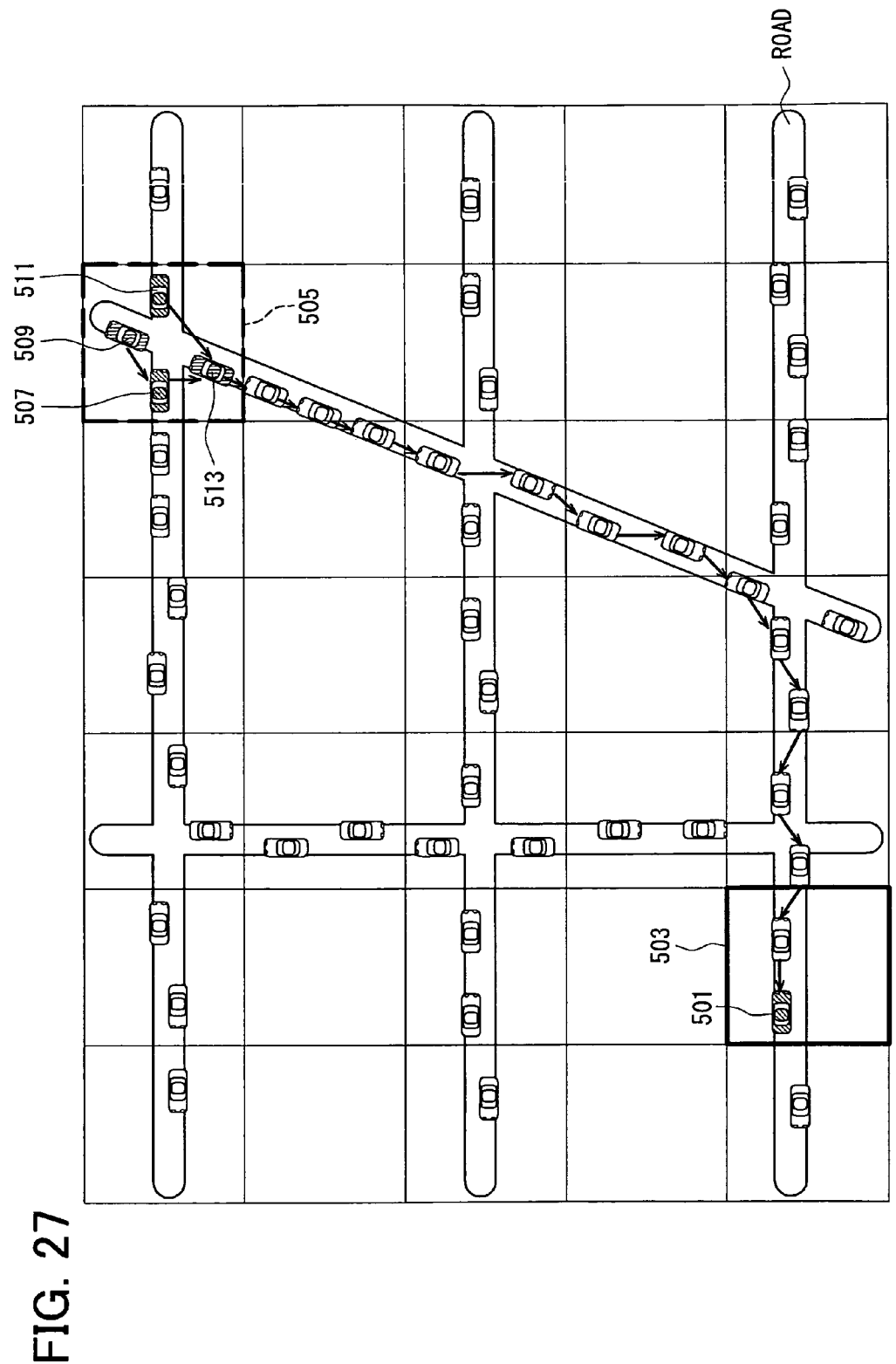
FIG. 27 is a map explaining a method for transferring a data response message, according to the fifth embodiment.

Here, one example of a transferring situation of the data response message will be explained by using the explanatory view of FIG. 27. FIG. 27 shows a map divided into zones of 7×5 measures, and each vehicle mounting the communication device 11 thereto is running a road. In FIG. 27, reference numeral 501 represents a data request vehicle, and reference numeral 503 represents a data request zone. In vehicles 507 to 513 existing in a target zone 505, it is now supposed that the data response message transmission processing is executed, and the data response message is transmitted to the communication device 11 mounted to an adjacent vehicle. Thus, in the communication device 11 mounted to a vehicle adjacent to these vehicles 507 to 513, the data response message reception-transfer processing is executed. However, on the basis of information stored to the memory 21 and relating to the vehicle transmitting and transferring the data request message, a message transfer destination vehicle is selected and the data response message is transferred. Namely, the data response message is transmitted and transferred to the communication device 11 of the vehicle receiving the data request message. For example, if the communication device 11 mounted to the vehicle 509 has received the data request message from the communication device 11 mounted to the vehicle 507, the communication device 11 mounted to the vehicle 509 transmits the data response message to the communication device 11 mounted to the vehicle 507. Accordingly, as can be seen from FIG. 27; no data response message is uselessly diffused.

The communication device 11 of the fifth embodiment mode has been explained above. In accordance with the communication device 11 of this embodiment mode, no diffusion is caused with respect to the data response message, and the response message is transmitted through only the communication device 11 of a required minimum. Therefore, the communication amount of the entire system can be reduced.

Sixth Embodiment Mode

The communication device 11 of a sixth embodiment mode will next be explained. The construction of the communication device 11 of the sixth embodiment mode is similar to that of the communication device 11 of the first embodiment mode, and its explanation is therefore omitted.

Various kinds of processings executed by the CPU 29 will be explained.

(1) Data Request Message Transmission Processing

First, data request message transmission processing is basically similar to the data request message transmission processing in the communication device 11 of the above first embodiment mode, and its detailed explanation is therefore omitted. The data request message transmission processing according to the first embodiment mode is shown in FIG. 2.

(2) Data Request Message Reception-Transfer Processing

Next, data request message reception-transfer processing will be explained by using the flow chart of FIG. 28. This data request message reception-transfer processing is processing beginning to be executed in the CPU 29 in supplying electric power to the communication device 11.

When the execution of the data request message reception-transfer processing is started, the CPU 29 first tries the reception of the data request message from another communication device through the wireless communication section 13, and judges whether the data request message can be received or not (S611). When it is judged that no data request message can be received (S611: No), it proceeds to S621 described later. In contrast to this, when it is judged that the data request message can be received (S611: Yes), the received data request message is transferred to the other communication devices except for the communication device previously performing the signal reception (S613).

Subsequently, it is judged whether a self vehicle (the vehicle mounting the communication device 11 thereto) exists in the target zone included in the received data request message or not (S615). This judgment is made on the basis of a zone generated by dividing a map by predetermined latitude and longitude on the basis of map data acquired from the navigation device 31, and data relating to the present position acquired from the position data acquiring section 17. When it is judged that no self vehicle exists in the target zone (S615: No), the processing proceeds to the above S611. In contrast to this, when it is judged that the self vehicle exists in the target zone (S615: Yes), it proceeds to S617.

In S617, it is judged whether the self vehicle is a data intensive vehicle or not. Here, the data intensive vehicle, i.e., a data aggregation vehicle, will be explained. The data intensive vehicle is one vehicle existing within each zone, and the communication device mounted to this vehicle intensively sets data (e.g., traffic information, weather information, etc.) able to be provided from another communication device in advance. Several data intensive vehicles may also exist within each zone instead of one data intensive vehicle, but it is desirable to set a sufficiently small number of data intensive vehicles in comparison with the total number of vehicles existing in the zone. In this embodiment mode, the data intensive vehicle is determined at random every constant time within each zone. However, the vehicle existing for a longest time in this zone may be set to the data intensive vehicle, and the vehicle having a slowest moving speed may be also set to the data intensive vehicle.

Figure 29:
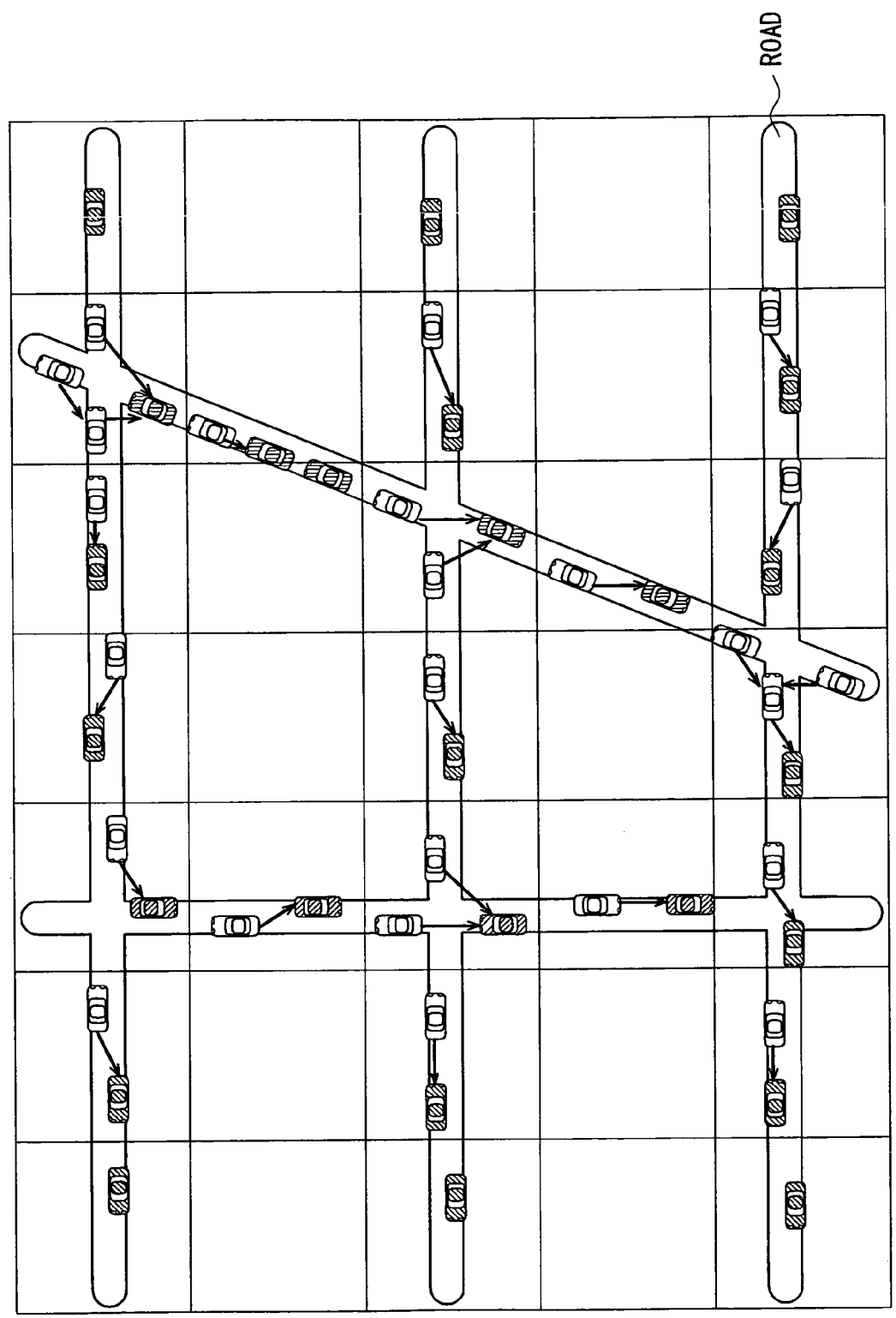
FIG. 29 is a map explaining a method for aggregating a data, according to the sixth embodiment.

This intensive situation will be explained by using FIG. 29. FIG. 29 is an explanatory view for explaining a situation in which providable data are intensively set in advance. As shown in FIG. 29, another vehicle (a vehicle omitted in white, i.e., a white vehicle) existing within the zone transmits the providable data to the data intensive vehicle (a vehicle of net laying, i.e., a shaded vehicle) determined every zone. As this result, the providable data within the zone are intensively collected in the data intensive vehicle (the vehicle of net laying). These data are stored to the memory 21.

Figure 28:
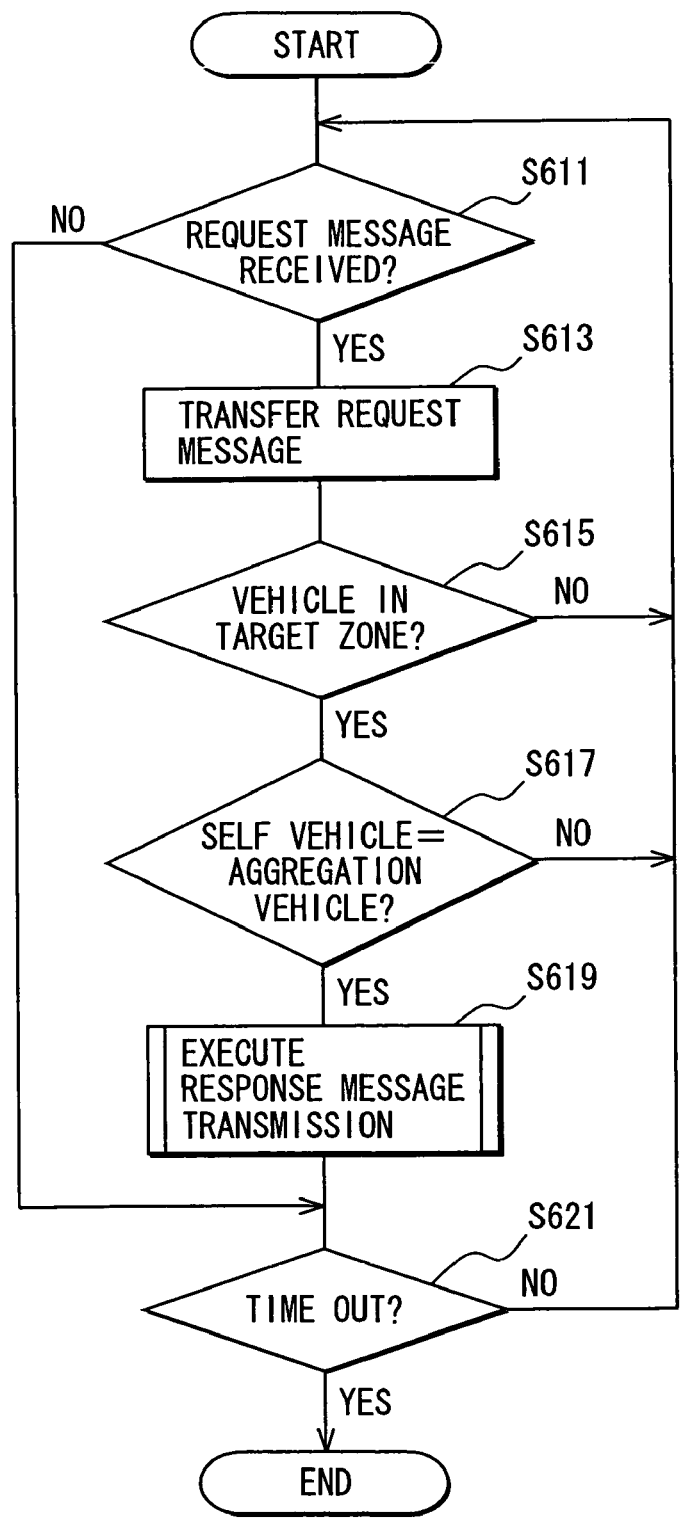
FIG. 28 is a flow chart showing a data request message receiving/transferring process, according to a sixth embodiment of the present invention.

The explanation is returned to FIG. 28. When it is judged in S617 that no self vehicle is a data intensive vehicle (S617: No), the processing proceeds to the above S611. In contrast to this, when it is judged that the self vehicle is a data intensive vehicle (S617: Yes), data request message transmission processing described later is executed (S619). When the data request message transmission processing is terminated, it is judged whether the time from the beginning of the data request message reception-transfer processing exceeds a predetermined time or not (S621). This judgment has the meaning that the data request message reception-transfer processing is normally terminated in a program. When it is desirous to terminate the data request message reception-transfer processing in another processing (program), etc., this processing (program), etc. are realized by rewriting the above predetermined time as e.g., "0".

When it is judged in this S621 that the time from the beginning of the data request message reception-transfer processing exceeds the predetermined time (S621: Yes), this processing (data request message reception-transfer processing) is terminated. In contrast to this, when it is judged that no time from the beginning of the data request message reception-transfer processing exceeds the predetermined time (S621: No), the processing proceeds to the above S611.

(3) Data Response Message Transmission Processing

Data response message transmission processing is basically similar to the data response message transmission processing in the communication device 11 of the above first embodiment mode, and its detailed explanation is therefore omitted. The data response message transmission processing according to the first embodiment mode is shown in FIG. 4.

(4) Data Response Message Reception-Transfer Processing

Data response message reception-transfer processing is basically similar to the data response message reception-transfer processing in the communication device 11 of the above first embodiment mode, and its detailed explanation is therefore omitted. The data response message reception-transfer processing according to the first embodiment mode is shown in FIG. 5.

Figure 30:
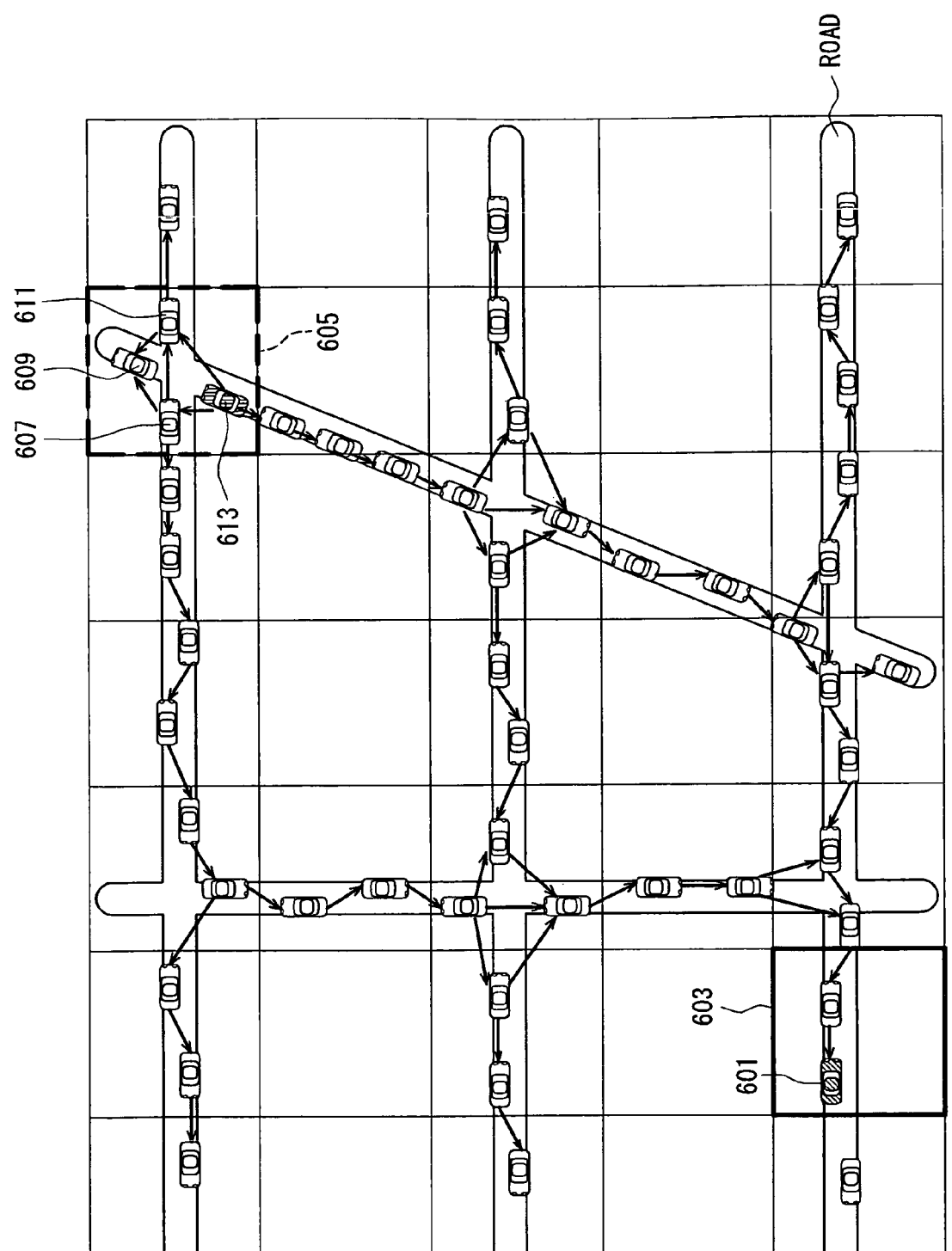
FIG. 30 is a map explaining a method for transferring a data response message, according to the sixth embodiment.

Here, one example of a transferring situation of the data response message will be explained by using the explanatory view of FIG. 30. FIG. 30 shows a map divided into zones of 7×5 measures, and each vehicle mounting the communication device 11 thereto is running a road. It is now supposed that the data request message transmitted from a data request vehicle 601 reaches all vehicles 607 to 613 (the data intensive vehicle is vehicle 613) existing in a target zone 605. In FIG. 30, reference numeral 603 represents a data request zone. With respect to the communication devices 11 mounted to these vehicles, the data response message transmission processing is executed with respect to only the communication device 11 mounted to the vehicle 613 as the data intensive vehicle. The data response message is transmitted from the communication device 11 mounted to the vehicle 613 to the communication device 11 mounted to an adjacent vehicle, and is transferred. Namely, the number of communication devices 11 constituting a signal transmitting source of the data response message within the target zone 605 is only one.

The communication device 11 of the sixth embodiment mode has been explained above. In accordance with the communication device 11 of this embodiment mode, the communication device 11 as a signal transmitting source of the data response message becomes only the communication device 11 mounted to the data intensive vehicle with respect to one request. Therefore, the number of transferred data response messages can be reduced in comparison with a case in which all the communication devices 11 within the zone become the signal transmitting source of the data response message.

Seventh Embodiment Mode

The communication device 11 of a seventh embodiment mode will next be explained. The construction of the communication device 11 of the seventh embodiment mode is similar to that of the communication device 11 of the first embodiment mode, and its explanation is therefore omitted.

Various kinds of processings executed by the CPU 29 will be explained.

(1) Data Request Message Transmission Processing

First, data request message transmission processing is basically similar to the data request message transmission processing in the communication device 11 of the above first embodiment mode, and its detailed explanation is therefore omitted. The data request message transmission processing according to the first embodiment mode is shown in FIG. 2.

(2) Data Request Message Reception-Transfer Processing

Next, data request message reception-transfer processing will be explained by using the flow chart of FIG. 31. This data request message reception-transfer processing is processing beginning to be executed in the CPU 29 in supplying electric power to the communication device 11.

When the execution of the data request message reception-transfer processing is started, the CPU 29 tries the reception of the data request message from another communication device through the wireless communication section 13, and judges whether the data request message can be received or not (S711). When it is judged that no data request message can be received (S711: No), it proceeds to S721 described later. In contrast to this, when it is judged that the data request message can be received (S711: Yes), the received data request message is transferred to the other communication devices except for the communication device previously performing the signal reception (S713).

Subsequently, it is judged whether a self vehicle (the vehicle mounting the communication device 11 thereto) exists in the target zone included in the received data request message or not (S715). This judgment is made on the basis of a zone generated by dividing a map by predetermined latitude and longitude on the basis of map data acquired from the navigation device 31, and data relating to the present position acquired from the position data acquiring section 17. When it is judged that no self vehicle exists in the target zone (S715: No), the processing proceeds to the above S711. In contrast to this, when it is judged that the self vehicle exists in the target zone (S715: Yes), it proceeds to S717.

In S717, it is judged whether the self vehicle is selected as a data response vehicle or not. Here, the data response vehicle will be explained. The data response vehicle is one vehicle existing within each zone, and is determined in advance. Several data response vehicles may also exist in each zone instead of one data response vehicle, but it is desirable to set a sufficiently small number of data response vehicles in comparison with the total number of vehicles existing in the zone. Further, in this embodiment mode, the data response vehicle is determined at random every constant time within each zone, but may be also determined by using another determining method.

Figure 32:
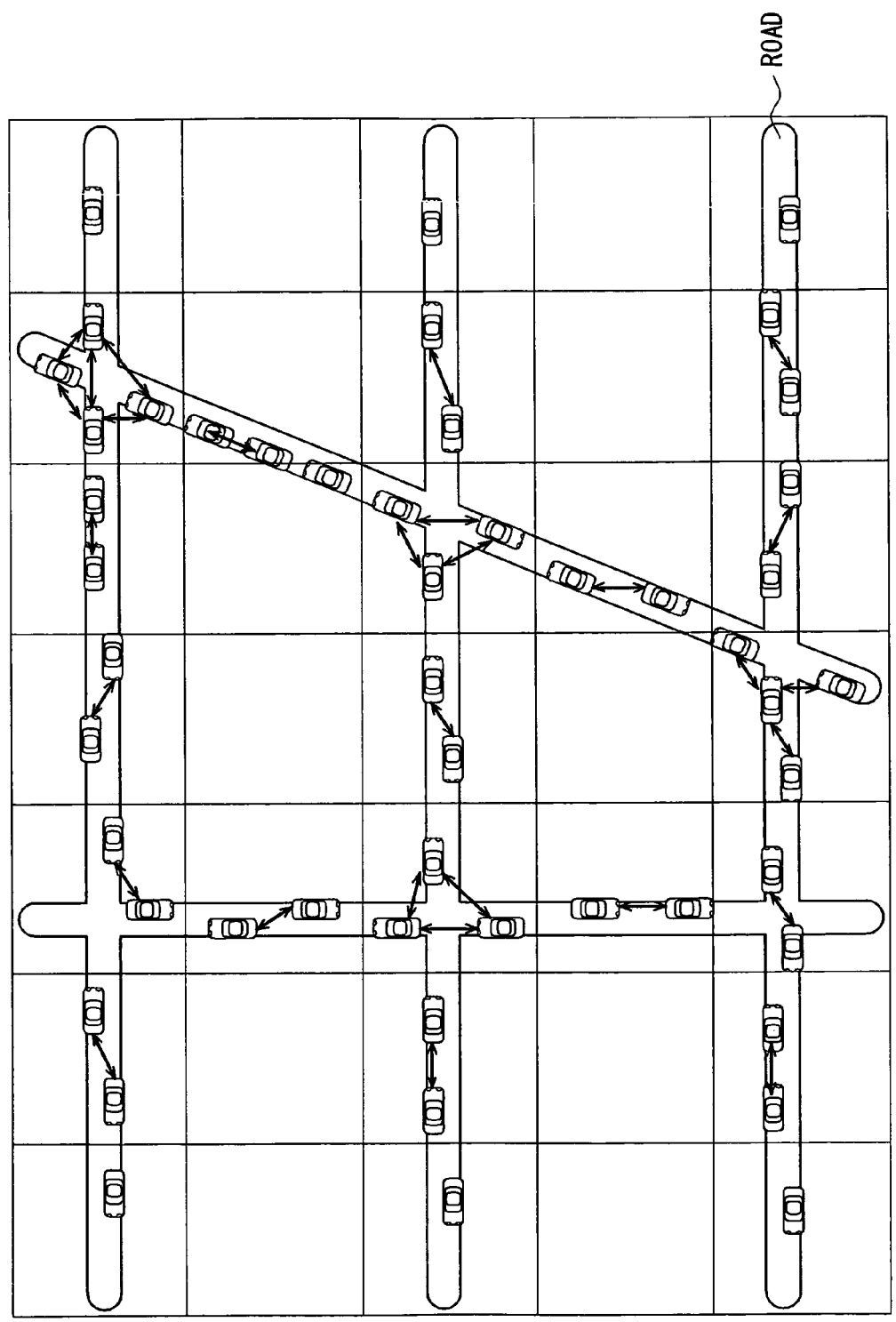
FIG. 32 is a map explaining a method for sharing a data, according to the seventh embodiment.

In this embodiment mode, providable data (e.g., traffic information, weather information, etc.) are communized between communication devices 11 within the zone. This communizing situation will be explained by using FIG. 32. As shown in FIG. 32, the providable data are exchanged between the communication devices 11 mounted to the vehicles every constant interval within each zone. Even when the communication device 11 of any vehicle is selected within the zone, all data within the zone can be obtained from this communication device 11.

Figure 31:
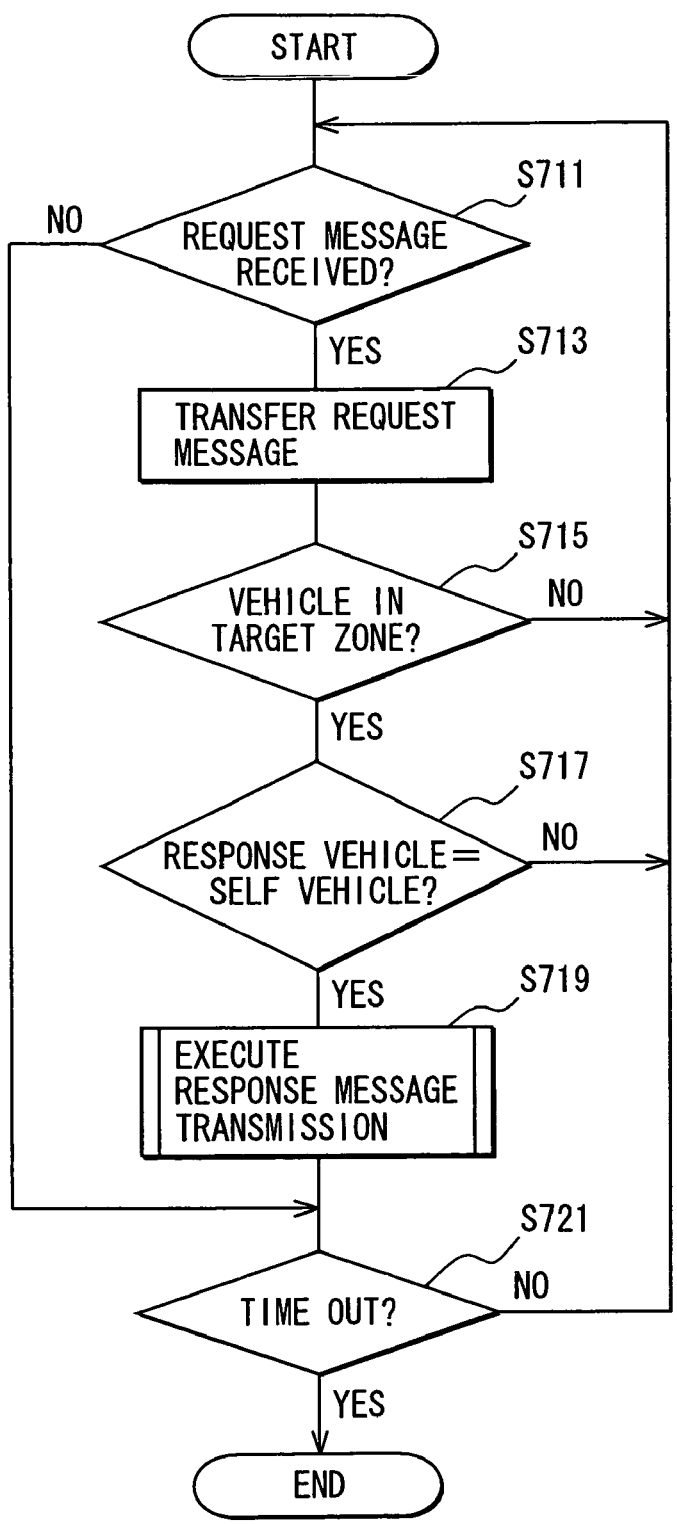
FIG. 31 is a flow chart showing a data request message receiving/transferring process, according to a seventh embodiment of the present invention.

The explanation is returned to FIG. 31. When it is judged in S717 that no self vehicle is selected as the data response vehicle (S717: No), the processing proceeds to the above S711. In contrast to this, when it is judged that the self vehicle is selected as the data response vehicle (S717: Yes), data request message transmission processing described later is executed (S719). When the data request message transmission processing is terminated, it is judged whether the time from the beginning of the data request message reception-transfer processing exceeds a predetermined time or not (S721). This judgment has the meaning that the data request message reception-transfer processing is normally terminated in a program. When it is desirous to terminate the data request message reception-transfer processing in another processing (program), etc., this processing (program), etc. are realized by rewriting the above predetermined time as e.g., "0".

When it is judged in this S721 that the time from the beginning of the data request message reception-transfer processing exceeds the predetermined time (S721: Yes), this processing (data request message reception-transfer processing) is terminated. In contrast to this, when it is judged that no time from the beginning of the data request message reception-transfer processing exceeds the predetermined time (S721: No), the processing proceeds to the above S711.

(3) Data Response Message Transmission Processing

Data response message transmission processing is basically similar to the data response message transmission processing in the communication device 11 of the above first embodiment mode, and its detailed explanation is therefore omitted. The data response message transmission processing according to the first embodiment mode is shown in FIG. 4.

(4) Data Response Message Reception-Transfer Processing

Data response message reception-transfer processing is basically similar to the data response message reception-transfer processing in the communication device 11 of the above first embodiment mode, and its detailed explanation is therefore omitted. The data response message reception-transfer processing according to the first embodiment mode is shown in FIG. 5.

Figure 33:
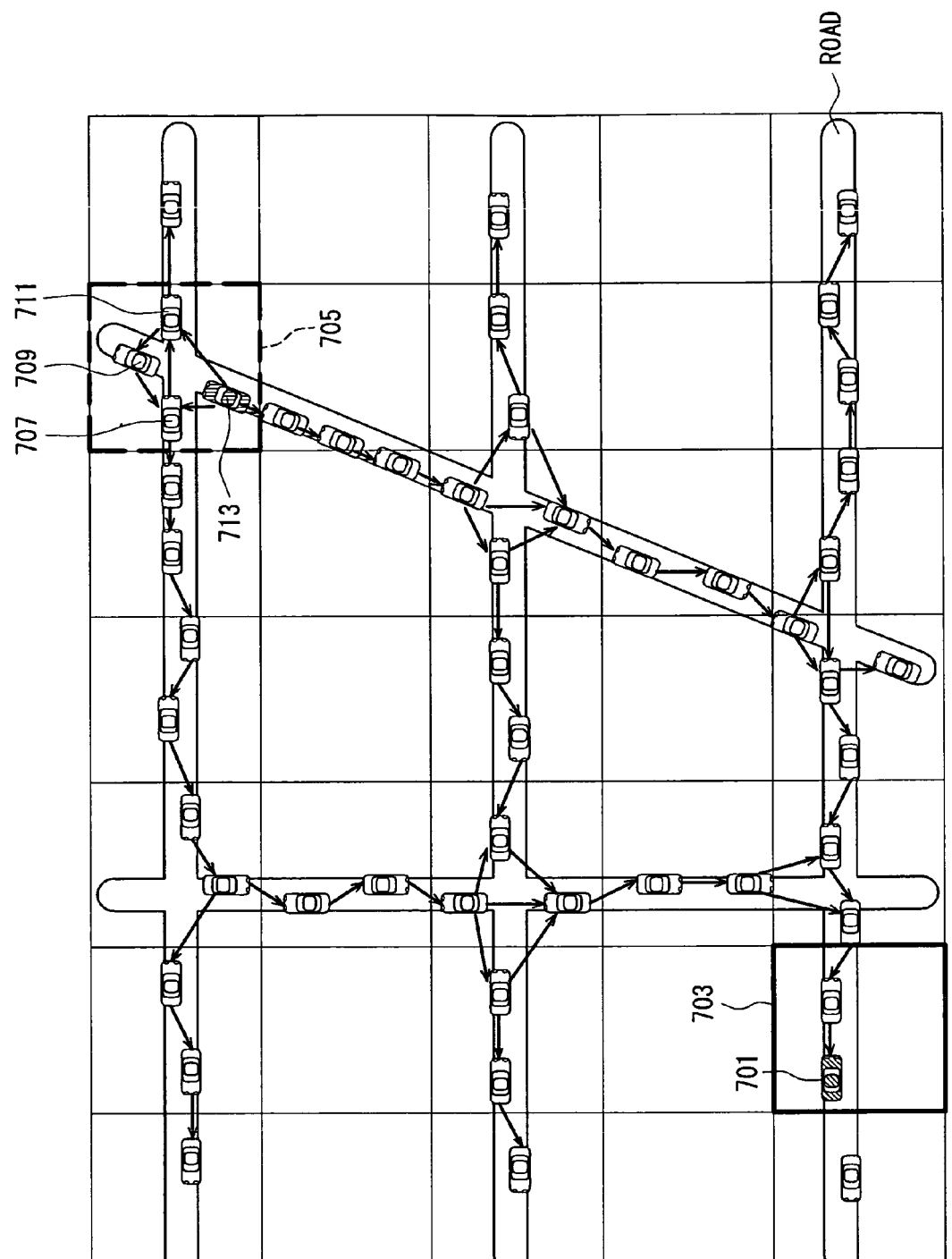
FIG. 33 is a map explaining a method for transferring a data response message, according to the seventh embodiment.

Here, one example of a transferring situation of the data response message will be explained by using the explanatory view of FIG. 33. FIG. 33 shows a map divided into zones of 7×5 measures, and each vehicle mounting the communication device 11 thereto is running a road. It is now supposed that the data request message transmitted from a data request vehicle 701 reaches all vehicles 707 to 713 (the data response vehicle is vehicle 713) existing in a target zone 705. In FIG. 33, reference numeral 703 represents a data request zone. With respect to the communication devices 11 mounted to these vehicles, the data response message transmission processing is executed with respect to only the communication device 11 mounted to the vehicle 713 as the data response vehicle. The data response message is transmitted from the communication device 11 mounted to the vehicle 713 to the communication device 11 mounted to an adjacent vehicle, and is transferred. Namely, the number of communication devices 11 constituting a signal transmitting source of the data response message within the target zone 705 is only one.

The communication device 11 of the seventh embodiment mode has been explained above. In accordance with the communication device 11 of this embodiment mode, the communication device 11 constituting the signal transmitting source of the data response message becomes only the communication device 11 mounted to the data response vehicle with respect to one request. Therefore, the number of transferred data response messages can be reduced in comparison with a case in which all the communication devices 11 within the zone become the signal transmitting source of the data response message.

Figure 34:
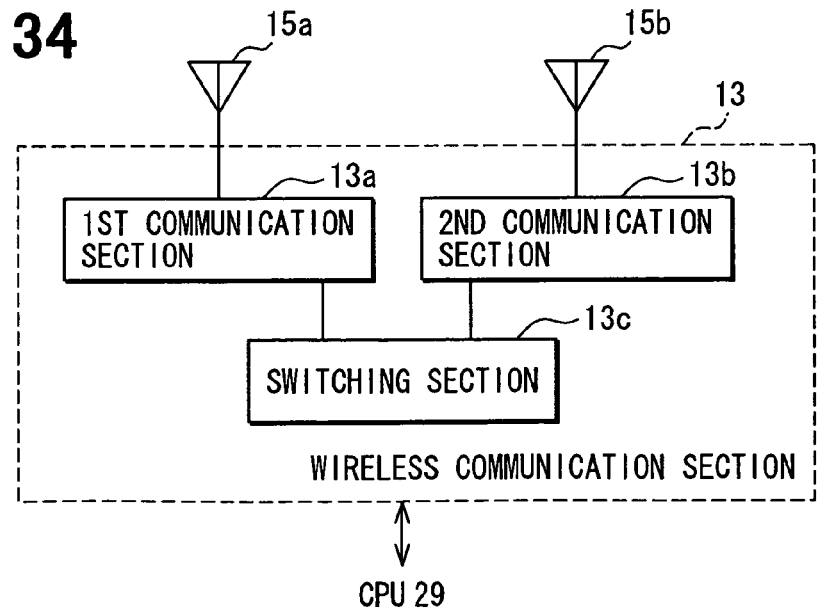
FIG. 34 is a block diagram showing a communication device according to a modification of the first embodiment of the present invention.

Other Embodiment Modes (1) The wireless communication section 13 of the communication device 11 in each of the above embodiment modes may be constructed so as to utilize only the wireless communication system of one kind, but may be also constructed so as to switch and utilize the wireless communication systems of plural kinds. For example, the wireless communication section 13 is preferably constructed as shown in FIG. 34. This wireless communication section 13 has a first wireless antenna 15a, a first communication section 13a connected to this first wireless antenna 15a, a second wireless antenna 15b, a second communication section 13b connected to this second wireless antenna 15b, and a wireless communication switching section 13c connected to the first communication section 13a and the second communication section 13b. The first communication section 13a and the second communication section 13b bear a communication function for performing protocol processing, etc., and performing communication through antennas respectively connected to the first communication section 13a and the second communication section 13b. The wireless communication switching section 13c bears a function for switching whether the CPU 29 and the first communication section 13a are connected, or whether the CPU 29 and the second communication section 13b are connected on the basis of commands from the CPU 29.

Accordingly, in accordance with the communication device 11 having such a wireless communication section 13, when the communication using one communication section is in a bad condition, etc., it is possible to switch this communication to communication using the other communication section. Therefore, obstruction resisting property is improved and reliability of the entire system is improved.

(2) In the above embodiment modes 3, 4, after a message is transmitted and transferred, the communication device 11 receiving this message judges whether it is necessary to further transfer the message or not (i.e., the communication device 11 judges whether the communication device 11 itself exists within the message transfer zone or not). However, the signal transmitting and transferring side may judge the existing zone of the communication device 11 of a signal transmitting destination (it may be judged whether the communication device 11 of the signal transmitting destination exists within the message transfer zone or not).

If such a construction is set, the communication amount of the entire system can be further reduced.

(3) Instead of partial hardware (e.g., the position data acquiring section 17, the display section 25, the speaker 27, etc.), hardware arranged in the navigation device 31 may be also constructed so as to be utilized. The communication device 11 is made compact by setting such a construction.

In the above embodiments, the memory 21 corresponds to an operation information possessing means. The position data acquiring section 17 corresponds to a position data acquiring means. The wireless communication section 13 corresponds to a communication means. The display section 25 and the speaker 27 correspond to a data output means.

Figure 2:
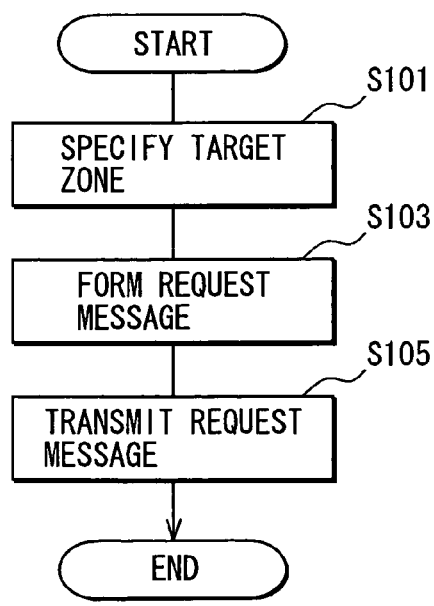
FIG. 2 is a flow chart showing a data request message transmitting process, according to the first embodiment.

The generation of a zone performed before the target zone in S101 of FIG. 2 is specified, corresponds to processing as a zone generating means. The processing of S101 of FIG. 2 corresponds to processing as a target zone specifying means.

Figure 4:
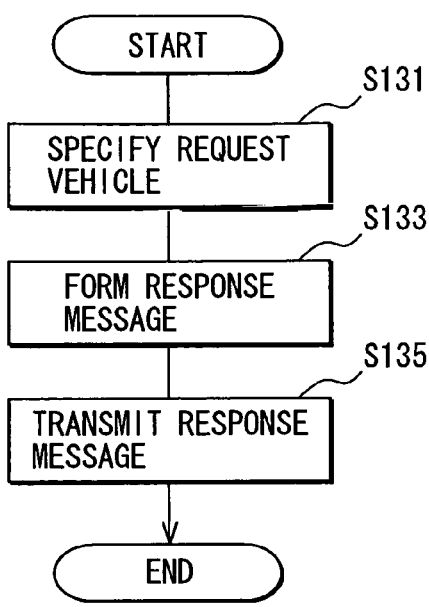
FIG. 4 is a flow chart showing a data response message transmitting process, according to the first embodiment.

The processing of S131 of FIG. 4 corresponds to processing as a request vehicle zone specifying means. The processing of S105 of FIG. 2 corresponds to processing as a data request message transmitting control means. The processing of S111 of FIG. 3 corresponds to processing as a data request message receiving control means. The processing of S113 of FIG. 3 corresponds to processing as a data request message transferring control means.

The processings of S131 to S135 of FIG. 4 correspond to processing as a data response message transmitting control means. The processing of S141 of FIG. 5 corresponds to processing as a data response message receiving control means. The processing of S147 of FIG. 5 corresponds to processing as a data response message transferring control means. The processing of S303 of FIG. 14 corresponds to processing as a message transfer zone specifying means.

When the message transfer zone is specified in S303 of FIG. 14, processing for acquiring road information through the navigation device 31 corresponds to processing as a road information acquiring means. The determination of the data intensive vehicle performed before the processing in S617 of FIG. 28, and the determination of the data response vehicle performed before the processing of S717 of FIG. 31 correspond to processing as a leader communication device specifying means.

The intensive collection of the providable data performed before the processing in S617 of FIG. 28 corresponds to processing as a zone interior operation information intensive means. The communization of the providable data performed before the processing of S717 of FIG. 31 corresponds to processing as a zone interior operation information communizing means.

The present invention has the following aspects.

A communication device for an automotive vehicle includes: a traffic information possessing means for possessing a traffic information regarding a self vehicle; a zoning means for dividing a predetermined area into a plurality of zones in a two-dimensional grid; a target zone specifying means for specifying a single target zone or a plurality of target zones from a plurality of zones, wherein the single target zone or each of a plurality of target zones includes a target communication device as an acquisition object of the traffic information; a positioning data acquiring means for acquiring a positioning data of the self vehicle; a communicating means for communicating with at least one of a plurality of cooperative communication devices by wireless, wherein a plurality of cooperative communication devices is disposed around the self vehicle; a data request message transmitting/controlling means for transmitting a data request message to at least one of a plurality of cooperative communication devices through the communicating means, wherein the data request message defines a data request vehicle identification information, the single target zone or a plurality of target zones, and an information for specifying the traffic information of the acquisition object, and wherein the data request vehicle identification information defines an identification information of a data request vehicle; a data request message receiving/controlling means for receiving the data request message, which is transmitted from at least one of a plurality of cooperative communication devices through the communicating means; a data request message transferring/controlling means for transferring the data request message received by the data request message receiving/controlling means to at least one of a plurality of cooperative communication devices; a data response message transmitting/controlling means for transmitting a data response message to at least one of a plurality of cooperative communication devices through the communicating means in a case where the self vehicle is disposed in the single target zone or a plurality of target zones defined in the data request message received by the data request message receiving/controlling means and where the traffic information of the acquisition object defined in the data request message is capable of transmitting and retrieving from the traffic information possessed in the traffic information possessing means, wherein the data response message defines the data request vehicle identification information defined in the data request message and the traffic information of the acquisition object defined in the data request message; a data response message receiving/controlling means for receiving the data response message through the communicating means from at least one of a plurality of cooperative communication devices; a data response message transferring/controlling means for transferring the data response message received by the data response message receiving/controlling means to at least one of a plurality of cooperative communication devices through the communicating means in a case where an identification information of the self vehicle does not correspond to the data request vehicle identification information defined in the data response message received by the data response message receiving/controlling means; and a data outputting means for outputting the traffic information of the acquisition object included in the data response message received by the data response message receiving/controlling means in a case where the identification information of the self vehicle corresponds to the data request vehicle identification information defined in the data response message received by the data response message receiving/controlling means.

The above communication device (hereinafter also said as "the communication device of the present invention") made to solve the above problem is a communication device mounted to a vehicle and used, and has an operation information possessing means possessing operation information as information involved in the operation of a self vehicle (the vehicle mounting this communication device thereto). For example, the "information involved in the operation" is delay information, accident information, breakdown information, weather information, etc.

Further, the communication device of the present invention has a zone generating means for virtually dividing a space in a two-dimensional mesh shape, and generating a zone. For example, it is considered that the "zone" said here is a zone partitioned by latitude and longitude.

Further, the communication device of the present invention has a position data acquiring means for acquiring data for specifying the present position of the self vehicle.

Further, the communication device of the present invention has a communication means for wirelessly communicating with the communication device mounted to another vehicle existing in the circumference of the self vehicle in single or plural target zones in which the communication device of a data acquiring object exists.

Further, the communication device of the present invention has a data request message transmitting control means. This data request message transmitting control means designates identification information of the self vehicle as data request vehicle identification information. Further, the data request message transmitting control means designates the target zone specified by a target zone specifying means, and transmits a data request message for designating information for specifying the operation information of an acquiring object to the communication device mounted to another vehicle existing in the circumference of the self vehicle through a communication means. The "designation" repeatedly used here means that it is set to be included within the data request message.

Further, the communication device of the present invention has a data request message receiving control means for receiving the data request message from the communication device mounted to another vehicle existing in the circumference of the self vehicle through a communication means.

Further, the communication device of the present invention has a data request message transferring control means for transferring the data request message received by the operation of the data request message receiving control means to the communication device mounted to another vehicle existing in the circumference of the self vehicle through a communication means.

Further, the communication device of the present invention has a data response message transmitting control means. When the position of the self vehicle specified on the basis of position data acquired by a position data acquiring means exists within a target zone designated by a data request message received by the operation of the data request message receiving control means, and the operation information designated by the data request message can be transmitted from the operation information possessed by the operation information possessing means, the data response message transmitting control means transmits this operation information to the communication device mounted to another vehicle existing in the circumference of the self vehicle through a communication means as the data response message together with the data request vehicle identification information designated by the data request message.

Further, the communication device of the present invention has a data response message receiving control means for receiving the data response message from the communication device mounted to another vehicle existing in the circumference of the self vehicle through a communication means.

Further, the communication device of the present invention has a data response message transferring control means. When the data request vehicle identification information designated by the data response message received by the operation of the data response message receiving control means and identification information of the self vehicle are not conformed, the data response message transferring control means transfers the data response message received by the operation of the data response message receiving control means to the communication device mounted to another vehicle existing in the circumference of the self vehicle through a communication means.

Further, the communication device of the present invention has a data output means. When the data request vehicle identification information designated by the data response message received by the operation of the data response message receiving control means and the identification information of the self vehicle are conformed, the data output means outputs the operation information included in the data response message received by the operation of the data response message receiving control means.

Thus, when the communication device of the present invention functions as a relaying (transferring) communication device, judgment processing is only "whether or not the self vehicle exists within the target zone and the operation information designated in the data request message is possessed or not", or "whether the data request vehicle identification information designated in the data response message and the identification information of the self vehicle are conformed or not". Therefore, required calculation capability can be set to be small in comparison with the background art case. Further, since the communication device of the present invention has the zone generating means, the information of a zone required in the communication can be personally generated. Accordingly, it is not necessary to acquire the information of the construction of the zone and the place of an object zone from a wireless base station, etc.

Thus, the above communication device establishes the transmission path without communicating with the wireless base station in a transmission path and establishes a method for restraining required calculation capability as much as possible. Further, the device directly performs communication between cooperative communication devices or performs communication through another cooperative communication device.

Alternatively, the data request message transmitting/controlling means may transmit the data request message together with an information regarding transferring times. The data response message transmitting/controlling means may transmit the data response message together with the information regarding transferring times. The data request message transferring/controlling means may determine whether the data request message is transferred or not on the basis of the information regarding the transferring times defined in the data request message. The data response message transferring/controlling means may determine whether the data response message is transferred or not on the basis of the information regarding the transferring times defined in the data response message.

The above construction is preferably set to prevent that the request message information and the response message are unlimitedly transferred. Namely, the data request message transmitting control means adds information relating to the number of transfer times to the data request message, and transmits this data request message. The data response message transmitting control means adds the information relating to the number of transfer times to the data response message, and transmits this data response message. The data request message transferring control means preferably determines the existence of transfer of the data request message on the basis of the information relating to the number of transfer times added to the data request message. The data response message transferring control means preferably determines the existence of transfer of the data transfer message on the basis of the information relating to the number of transfer times added to the data response message.

Thus, the communication amount of the entire system constructed by plural communication devices can be reduced by limiting the number of transfer times.

Alternatively, the device may further include: a request vehicle zone specifying means for specifying a request vehicle zone, in which the request vehicle is disposed, on the basis of the positioning data acquired by the positioning data acquiring means; and a message transfer zone specifying means for specifying a message transfer zone defined by a part of a plurality of zones, which includes the request vehicle zone specified by the request vehicle zone specifying means and the single target zone or a plurality of target zones specified by the target zone specifying means. The part of a plurality of zones is adjacent together so that the part of a plurality of zones links the request vehicle zone and the single target zone or a plurality of target zones. The data request message transmitting/controlling means transmits the data request message together with an information regarding the message transfer zone. The data response message transmitting/controlling means transmits the data response message together with the information regarding the message transfer zone. The data request message transferring/controlling means determines whether the data request message is transferred or not on the basis of the information regarding the message transfer zone defined in the data request message and the positioning data acquired by the positing data acquiring means. The data response message transferring/controlling means determines whether the data response message is transferred or not on the basis of the information regarding the message transfer zone defined in the data response message and the positioning data acquired by the positing data acquiring means.

In the above device, the transferred zone may be also limited to reduce the communication amount of the entire system. Namely, the communication device is further constructed so as to have a request vehicle zone specifying means and a message transfer zone specifying means. In the zone generated by the zone generating means, the request vehicle zone specifying means specifies an existing zone of the self vehicle specified on the basis of the acquired position data of the position data acquiring means as a request vehicle zone. The message transfer zone specifying means specifies a limited number of zones adjacent to each other and including the request vehicle zone specified by the request vehicle zone specifying means and the target zone specified by the target zone specifying means as the message transfer zone from the zones generated by the zone generating means. The data request message transmitting control means may add information relating to the message transfer zone to the data request message, and may transmit this data request message. The data response message transmitting control means may add the information relating to the message transfer zone and added to the data request message to the data response message, and may transmit this data response message. The data request message transferring control means may also determine the existence of transfer of the data request message on the basis of the acquired position data of the position data acquiring means and the information relating to the message transfer zone and added to the data request message. The data response message transferring control means may also determine the existence of transfer of the data response message on the basis of the acquired position data of the position data acquiring means and the information relating to the message transfer zone and added to the data response message.

Thus, the communication device firstly transmitting a request sets the transferred zone of the message. Thus, it is possible to prevent that the message is further transferred from the communication device of an inappropriate zone (the zone of a low possibility that the message is transmitted to the communication device of an object). Namely, the communication amount of the entire system can be reduced.

Alternatively, the device may further include: a request vehicle zone specifying means for specifying a request vehicle zone, in which the request vehicle is disposed, on the basis of the positioning data acquired by the positioning data acquiring means; and a message transfer zone specifying means for specifying a message transfer zone defined by a part of a plurality of zones, which includes the request vehicle zone specified by the request vehicle zone specifying means and the single target zone or a plurality of target zones specified by the target zone specifying means. The part of a plurality of zones is adjacent together so that the part of a plurality of zones links the request vehicle zone and the single target zone or a plurality of target zones. The data request message transmitting/controlling means transmits the data request message together with an information regarding the request vehicle zone specified by the request vehicle zone specifying means and the single target zone or a plurality of target zones specified by the target zone specifying means. The data response message transmitting/controlling means transmits the data response message together with an information regarding the request vehicle zone and the single target zone or a plurality of target zones, which are defined in the data request message. The message transfer zone specifying means specifies the message transfer zone on the basis of the information regarding the request vehicle zone and the single target zone or a plurality of target zones, which are defined in the data request message or in the data response message. The data request message transferring/controlling means determines whether the data request message is transferred or not on the basis of the message transfer zone specified by the message transfer zone specifying means and the positioning data acquired by the positing data acquiring means. The data response message transferring/controlling means determines whether the data response message is transferred or not on the basis of the message transfer zone specified by the message transfer zone specifying means and the positioning data acquired by the positing data acquiring means.

In the above device, the relaying (transferring) communication device may be also adapted to specify the zone for transferring the message and determine the existence of transfer so as to reduce the communication amount of the entire system. Namely, the communication device is further constructed so as to have a request vehicle zone specifying means and a message transfer zone specifying means. In the zone generated by the zone generating means, the request vehicle zone specifying means specifies an existing zone of the self vehicle specified on the basis of the acquired position data of the position data acquiring means as a request vehicle zone. The message transfer zone specifying means specifies a limited number of zones adjacent to each other and including the request vehicle zone and the target zone as the message transfer zone from the zones generated by the zone generating means. The data request message transmitting control means may add information relating to the request vehicle zone specified by the request vehicle zone specifying means and the target zone specified by the target zone specifying means to the data request message, and may transmit the data request message. The data response message transmitting control means may add the information relating to the request vehicle zone added to the data request message and the target zone to the data response message, and may transmit the data response message. The message transfer zone specifying means may specify the message transfer zone on the basis of information relating to the request vehicle zone and the target zone added to the data request message or the data response message. The data request message transferring control means may determine the existence of transfer of the data request message on the basis of the acquired position data of the position data acquiring means and the message transfer zone specified by the message transfer zone specifying means. The data response message transferring control means may determine the existence of transfer of the data response message on the basis of the acquired position data of the position data acquiring means and the message transfer zone specified by the message transfer zone specifying means.

Thus, even when it is constructed so as to specify the zone for transferring the message and determine the existence of transfer in the relaying (transferring) communication device, it is possible to prevent the message from being transferred until the communication device of an inappropriate zone (the zone of a low possibility that the message is transmitted to the communication device of an object). Namely, the communication amount of the entire system can be reduced.

Alternatively, the device may further include: a traffic information acquiring means for acquiring a traffic information regarding a road. The message transfer zone specifying means specifies the message transfer zone along with a single passage or a plurality of passages linking between the request vehicle zone and the single target zone or a plurality of target zones on the basis of the traffic information of the road.

In the above case, it is now supposed that the communication device of the present invention is mounted to a vehicle and is used. Therefore, the necessity that the place of a low existing possibility of the vehicle is set to the message transfer zone, is low. Further, even when the message is transferred on a road unable to achieve the zone of an object from the existing place of the communication device requesting information, the possibility able to obtain the information of the object is low. The necessity that the zone having only such a road is set to the message transfer zone, is low.

Specifically, in the above device, the communication device further has a road information acquiring means for acquiring information relating to a road. The message transfer zone specifying means preferably specifies the message transfer zone along single or plural roads for connecting the request vehicle zone and the target zone on the basis of the information relating to the road acquired by the road information acquiring means.

In accordance with such a construction, the message is transferred in only the zone of high value in transferring the message when the information of an object is obtained. Therefore, the effect of reducing the communication amount of the entire system is obtained.

Alternatively, the data request message receiving/controlling means may memorize a receiving communication device information for specifying a receiving communication device, which receives the data request message. The data response message transmitting/controlling means and the data response message transferring/controlling means may transmit and transfer the data response message to at least one of cooperative communication devices, which is specified by the receiving communication device information.

In the above device, a transmitting route (going path) of the data request message and a transmitting route (returning path) of the data response message may be set so as to transfer these messages by separate routes. However, the data response message is preferably transferred by the same route as the transmitting route of the data request message. Namely, the data request message receiving control means preferably stores information for specifying the communication device receiving the data request message as receiving communication device information. The data response message transmitting means and the data response message transferring control means preferably transmit the data response message to at least one of the communication devices specified by the receiving communication device information.

In accordance with such a construction, no diffusion of the data response message is generated, and the data response message is transmitted through only the communication device of a required minimum. Therefore, the communication amount of the entire system can be reduced.

Alternatively, the device may further include: a leader communication device specifying means for specifying a leader communication device in each zone; and a zone traffic information aggregating means for aggregating the traffic information possessed in the traffic information possessing means to the leader communication device through the communication means. The data response message transmitting/controlling means transmits the data response message only in a case where self communication device on the self vehicle is the leader communication device.

When plural responsible communication devices exist in the target zone, the case that the data response message is transmitted from each communication device, is considered. In such a case, it is also considered that plural data response messages of the same contents are transmitted from a different response source to a request communication device. It is said that this is inefficient from the viewpoint of communication efficiency of the entire system.

Therefore, in the above device, the communication device is further preferably constructed so as to have a leader communication device specifying means for specifying a leader communication device within each zone generated by the zone generating means, and a zone interior operation information intensive means for intensively collecting information possessed by the operation information possessing means into the leader communication device specified by the leader communication device specifying means through a communication means. The data response message transmitting control means preferably transmits the data response message only when the self communication device is the leader communication device.

If the communication device is constructed in this way and only one leader communication device is specified, it is possible to prevent that plural data response messages of the same kind of contents are transmitted from a different response source to a request communication device. Accordingly, the communication amount of the entire system can be reduced.

Alternatively, the device may further include: a leader communication device specifying means for specifying a leader communication device in each zone; and a zone traffic information sharing means for sharing the traffic information possessed in the traffic information possessing means among the cooperative communication devices in each zone through the communication means. The data response message transmitting/controlling means transmits the data response message only in a case where the communication device of the self vehicle is the leader communication device.

In the above device, the operation information possessed by the operation information possessing means may be communized within the zone in advance, and only a selected communication device may transmit the data response message. Namely, the communication device is further constructed so as to have a leader communication device specifying means for specifying the leader communication device within each zone generated by the zone generating means, and a zone interior operation information communizing means for communizing the operation information possessed by the operation information possessing means through a communication means by the communication device within each zone generated by the zone generating means. The data response message transmitting control means may transmit the data response message only when the self communication device is the leader communication device.

If only one leader communication device is specified even when such a construction is set, it is possible to prevent that plural response messages of the same kind of contents are transmitted from a different response source to a request communication device. Accordingly, the communication amount of the entire system can be reduced.

Alternatively, the device may further include: a communicating device switching means. The communicating means includes a plurality of wireless communicating devices, each of which has a different communicating method, and the communicating device switching means selects one of the wireless communicating devices on the basis of a predetermined condition.

The wireless communication means may be constructed by one means. However, in the above device, the wireless communication means may be also constructed by plural wireless communication means of communication methods different from each other. The communication device preferably has a wireless communication switching means for selecting one of the plural wireless communication means on the basis of a predetermined condition. The "predetermined condition" said here is a communicable one, a high communication speed, a cheap one in communication cost, etc.

In accordance with such a construction, for example, obstacle resisting property can be improved and operation cost can be restrained by setting the predetermined desirable condition.

Further, a communication device for acquiring a traffic information of an acquisition object is provided. The communication device is mounted on an automotive vehicle. The device includes: a communicating element for communicating with at least one of a plurality of cooperative communication devices, which is disposed around the communication device; a request message transmitting element for transmitting a request message to at least one of a plurality of cooperative communication devices through the communicating element, wherein the request message includes a request vehicle identification information, a target zone information and an information for specifying the traffic information of the acquisition object, wherein the request vehicle identification information defines an identification information of a request vehicle, which requests the traffic information of the acquisition object, and wherein the target zone information defines a target zone, in which a target communication device as the acquisition object is disposed; a request message receiving element for receiving the request message, which is transmitted from at least one of a plurality of cooperative communication devices; a request message transferring element for transferring the request message to at least one of a plurality of cooperative communication devices, the request message received by the request message receiving element; a response message transmitting element for transmitting a response message to at least one of a plurality of cooperative communication devices when the automotive vehicle is disposed in the target zone and when the traffic information of the acquisition object is capable of transmitting and retrieving from the traffic information of the automotive vehicle, wherein the response message includes the request vehicle identification information and the traffic information of the acquisition object; a response message receiving element for receiving the response message from at least one of a plurality of cooperative communication devices; a response message transferring element for transferring the response message to at least one of a plurality of cooperative communication devices when the automotive vehicle is not the request vehicle; and an outputting element for outputting the traffic information of the acquisition object to an external circuit when the automotive vehicle is the request vehicle.

Thus, the above communication device establishes the transmission path without communicating with the wireless base station in a transmission path and establishes a method for restraining required calculation capability as much as possible. Further, the device directly performs communication between cooperative communication devices or performs communication through another cooperative communication device.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A communication device for an automotive vehicle comprising:
    a traffic information possessing means for possessing a traffic information regarding a self vehicle;
    a zoning means for dividing a predetermined area into a plurality of zones in a two-dimensional grid;
    a target zone specifying means for specifying a single target zone or a plurality of target zones from a plurality of zones, wherein the single target zone or each of a plurality of target zones includes a target communication device as an acquisition object of the traffic information;
    a positioning data acquiring means for acquiring a positioning data of the self vehicle;

a communicating means for communicating with at least one of a plurality of cooperative communication devices by wireless, wherein a plurality of cooperative communication devices is disposed around the self vehicle;

a data request message transmitting/controlling means for transmitting a data request message to at least one of a plurality of cooperative communication devices through the communicating means, wherein the data request message defines a data request vehicle identification information, the single target zone or a plurality of target zones, and an information for specifying the traffic information of the acquisition object, and wherein the data request vehicle identification information defines an identification information of a data request vehicle;

a data request message receiving/controlling means for receiving the data request message, which is transmitted from at least one of a plurality of cooperative communication devices through the communicating means;

a data request message transferring/controlling means for transferring the data request message received by the data request message receiving/controlling means to at least one of a plurality of cooperative communication devices;

a data response message transmitting/controlling means for transmitting a data response message to at least one of a plurality of cooperative communication devices through the communicating means in a case where the self vehicle is disposed in the single target zone or a plurality of target zones defined in the data request message received by the data request message receiving/controlling means and where the traffic information of the acquisition object defined in the data request message is capable of transmitting and retrieving from the traffic information possessed in the traffic information possessing means, wherein the data response message defines the data request vehicle identification information defined in the data request message and the traffic information of the acquisition object defined in the data request message;

a data response message receiving/controlling means for receiving the data response message through the communicating means from at least one of a plurality of cooperative communication devices;

a data response message transferring/controlling means for transferring the data response message received by the data response message receiving/controlling means to at least one of a plurality of cooperative communication devices through the communicating means in a case where an identification information of the self vehicle does not correspond to the data request vehicle identification information defined in the data response message received by the data response message receiving/controlling means;

a data outputting means for outputting the traffic information of the acquisition object included in the data response message received by the data response message receiving/controlling means in a case where the identification information of the self vehicle corresponds to the data request vehicle identification information defined in the data response message received by the data response message receiving/controlling means;

a request vehicle zone specifying means for specifying a request vehicle zone, in which the request vehicle is disposed, on the basis of the positioning data acquired by the positioning data acquiring means; and a message transfer zone specifying means for specifying a message transfer zone defined by a part of a plurality of zones, which includes the request vehicle zone specified by the request vehicle zone specifying means and the single target zone or a plurality of target zones specified by the target zone specifying means, wherein the part of a plurality of zones is adjacent together so that the part of a plurality of zones links the request vehicle zone and the single target zone or a plurality of target zones, the data request message transmitting/controlling means transmits the data request message together with an information regarding the message transfer zone, the data response message transmitting/controlling means transmits the data response message together with the information regarding the message transfer zone, the data request message transferring/controlling means determines whether the data request message is transferred or not on the basis of the information regarding the message transfer zone defined in the data request message and the positioning data acquired by the positioning data acquiring means, and the data response message transferring/controlling means determines whether the data response message is transferred or not on the basis of the information regarding the message transfer zone defined in the data response message and the positioning data acquired by the positioning data acquiring means.

2. The device according to claim 1, wherein the data request message transmitting/controlling means transmits the data request message together with an information regarding transferring times, the data response message transmitting/controlling means transmits the data response message together with the information regarding transferring times, the data request message transferring/controlling means determines whether the data request message is transferred or not on the basis of the information regarding the transferring times defined in the data request message, and the data response message transferring/controlling means determines whether the data response message is transferred or not on the basis of the information regarding the transferring times defined in the data response message.

3. The device according to claim 1, further comprising:

a traffic information acquiring means for acquiring a traffic information regarding a road, wherein the message transfer zone specifying means specifies the message transfer zone along with a single passage or a plurality of passages linking between the request vehicle zone and the single target zone or a plurality of target zones on the basis of the traffic information of the road.

4. The device according to claim 1, wherein the data request message receiving/controlling means memorizes a receiving communication device information for specifying a receiving communication device, which receives the data request message, and the data response message transmitting/controlling means and the data response message transferring/controlling means transmits and transfers the data response message to at least one of cooperative communication devices, which is specified by the receiving communication device information.

5. The device according to claim 1, further comprising:

a leader communication device specifying means for specifying a leader communication device in each zone; and a zone traffic information aggregating means for aggregating the traffic information possessed in the traffic information possessing means to the leader communication device through the communication means, wherein the data response message transmitting/controlling means transmits the data response message only in a case where self communication device on the self vehicle is the leader communication device.

6. The device according to claim 1, further comprising:

a leader communication device specifying means for specifying a leader communication device in each zone; and a zone traffic information sharing means for sharing the traffic information possessed in the traffic information possessing means among the cooperative communication devices in each zone through the communication means, wherein the data response message transmitting/controlling means transmits the data response message only in a case where the communication device of the self vehicle is the leader communication device.

7. The device according to claim 1, farther comprising:

a communicating device switching means, wherein the communicating means includes a plurality of wireless communicating devices, each of which has a different communicating method, and the communicating device switching means selects one of the wireless communicating devices on the basis of a predetermined condition.

8. A communication device for an automotive vehicle comprising:

a traffic information possessing means for possessing a traffic information regarding a self vehicle;

a zoning means for dividing a predetermined area into a plurality of zones in a two-dimensional grid;

a target zone specifying means for specifying a single target zone or a plurality of target zones from a plurality of zones, wherein the single target zone or each of a plurality of target zones includes a target communication device as an acquisition object of the traffic information;

a positioning data acquiring means for acquiring a positioning data of the self vehicle;

a communicating means for communicating with at least one of a plurality of cooperative communication devices by wireless, wherein a plurality of cooperative communication devices is disposed around the self vehicle;

a data request message transmitting/controlling means for transmitting a data request message to at least one of a plurality of cooperative communication devices through the communicating means, wherein the data request message defines a data request vehicle identification information, the single target zone or a plurality of target zones, and an information for specifying the traffic information of the acquisition object, and wherein the data request vehicle identification information defines an identification information of a data request vehicle;

a data request message receiving/controlling means for receiving the data request message, which is transmitted from at least one of a plurality of cooperative communication devices through the communicating means;

a data request message transferring/controlling means for transferring the data request message received by the data request message receiving/controlling means to at least one of a plurality of cooperative communication devices;

a data response message transmitting/controlling means for transmitting a data response message to at least one of a plurality of cooperative communication devices through the communicating means in a case where the self vehicle is disposed in the single target zone or a plurality of target zones defined in the data request message received by the data request message receiving/controlling means and where the traffic information of the acquisition object defined in the data request message is capable of transmitting and retrieving from the traffic information possessed in the traffic information possessing means, wherein the data response message defines the data request vehicle identification information defined in the data request message and the traffic information of the acquisition object defined in the data request message;

a data response message receiving/controlling means for receiving the data response message through the communicating means from at least one of a plurality of cooperative communication devices;

a data response message transferring/controlling means for transferring the data response message received by the data response message receiving/controlling means to at least one of a plurality of cooperative communication devices through the communicating means in a case where an identification information of the self vehicle does not correspond to the data request vehicle identification information defined in the data response message received by the data response message receiving/controlling means;

a data outputting means for outputting the traffic information of the acquisition object included in the data response message received by the data response message receiving/controlling means in a case where the identification information of the self vehicle corresponds to the data request vehicle identification information defined in the data response message received by the data response message receiving/controlling means;

a request vehicle zone specifying means for specifying a request vehicle zone, in which the request vehicle is disposed, on the basis of the positioning data acquired by the positioning data acquiring means; and a message transfer zone specifying means for specifying a message transfer zone defined by a part of a plurality of zones, which includes the request vehicle zone specified by the request vehicle zone specifying means and the single target zone or a plurality of target zones specified by the target zone specifying means, wherein the part of a plurality of zones is adjacent together so that the part of a plurality of zones links the request vehicle zone and the single target zone or a plurality of target zones, the data request message transmitting/controlling means transmits the data request message together with an information regarding the request vehicle zone specified by the request vehicle zone specifying means and the single target zone or a plurality of target zones specified by the target zone specifying means, the data response message transmitting/controlling means transmits the data response message together with an information regarding the request vehicle zone and the single target zone or a plurality of target zones, which are defined in the data request message, the message transfer zone specifying means specifies the message transfer zone on the basis of the information regarding the request vehicle zone and the single target zone or a plurality of target zones, which are defined in the data request message or in the data response message, the data request message transferring/controlling means determines whether the data request message is transferred or not on the basis of the message transfer zone specified by the message transfer zone specifying means and the positioning data acquired by the positioning data acquiring means, and the data response message transferring/controlling means determines whether the data response message is transferred or not on the basis of the message transfer zone specified by the message transfer zone specifying means and the positioning data acquired by the positioning data acquiring means.

9. The device according to claim 8, further comprising:

a traffic information acquiring means for acquiring a traffic information regarding a road, wherein the message transfer zone specifying means specifies the message transfer zone along with a single passage or a plurality of passages linking between the request vehicle zone and the single target zone or a plurality of target zones on the basis of the traffic information of the road.

10. A communication device for acquiring a traffic information of an acquisition object, wherein the communication device is mounted on an automotive vehicle, the device comprising:

a communicating element for communicating with at least one of a plurality of cooperative communication devices, which is disposed around the communication device;

a request message transmitting element for transmitting a request message to at least one of a plurality of cooperative communication devices through the communicating element, wherein the request message includes a request vehicle identification information, a target zone information and an information for specifying the traffic information of the acquisition object, wherein the request vehicle identification information defines an identification information of a request vehicle, which requests the traffic information of the acquisition object, and wherein the target zone information defines a target zone, in which a target communication device as the acquisition object is disposed;

a request message receiving element for receiving the request message, which is transmitted from at least one of a plurality of cooperative communication devices;

a request message transferring element for transferring the request message to at least one of a plurality of cooperative communication devices, the request message received by the request message receiving element;

a response message transmitting element for transmitting a response message to at least one of a plurality of cooperative communication devices when the automotive vehicle is disposed in the target zone and when the traffic information of the acquisition object is capable of transmitting and retrieving from the traffic information in the communication device of the automotive vehicle, wherein the response message includes the request vehicle identification information and the traffic information of the acquisition object;

a response message receiving element for receiving the response message from at least one of a plurality of cooperative communication devices;

a response message transferring element for transferring the response message to at least one of a plurality of cooperative communication devices when the automotive vehicle is not the request vehicle;

an outputting element for outputting the traffic information of the acquisition object to an external circuit when the automotive vehicle is the request vehicle;

a request vehicle zone specifying element for specifying a request vehicle zone, in which the request vehicle is disposed; and a message transfer zone specifying element for specifying a message transfer zone, which includes the request vehicle zone and the target zone so that the message transfer zone links the request vehicle zone and the target zone, wherein the request message transmitting element transmits the request message together with an information of the message transfer zone, the response message transmitting element transmits the response message together with the information of the message transfer zone, the request message transferring element determines whether the request message is transferred or not on the basis of the information of the message transfer zone and a position of the automotive vehicle, and the response message transferring element determines whether the response message is transferred or not on the basis of the information of the message transfer zone and the position of the automotive vehicle.

11. The device according to claim 10, wherein the request message transmitting element transmits the request message together with an information of transferring times, the response message transmitting element transmits the response message together with the information of transferring times, the request message transferring element determines whether the request message is transferred or not on the basis of the information of transferring times defined in the request message, and the response message transferring element determines whether the response message is transferred or not on the basis of the information of transferring times defined in the response message.

12. The device according to claim 10, further comprising:

a road information acquiring element for acquiring a traffic information of a road, wherein the message transfer zone specifying element specifies the message transfer zone along with a single passage or a plurality of passages linking between the request vehicle zone and the target zone on the basis of the traffic information of the road.

13. The device according to claim 10, wherein the request message receiving element memorizes a receiving communication device information for specifying a receiving communication device, which receives the request message, and the response message transmitting element and the response message transferring element transmits and transfers the response message to at least one of cooperative communication devices, which is specified by the receiving communication device information.

14. The device according to claim 10, further comprising:

a leader communication device specifying element for specifying a leader communication device in at least one of a plurality of zones of a predetermined area, wherein the area is divided into a plurality of zones in a two-dimensional grid, and wherein the automotive vehicle is disposed in the area; and a zone traffic information aggregating element for aggregating the traffic information to the leader communication device through the communication element, wherein a plurality of zones includes the request zone and the target zone, the response message transmitting element transmits the response message only when the communication device is the leader communication device.

15. The device according to claim 10, further comprising:

a leader communication device specifying element for specifying a leader communication device in at least one of a plurality of zones of a predetermined area, wherein the area is divided into a plurality of zones in a two-dimensional grid, and wherein the automotive vehicle is disposed in the area; and a zone traffic information sharing element for sharing the traffic information among the cooperative communication devices in each zone, wherein a plurality of zones includes the request zone and the target zone, the response message transmitting element transmits the response message only when the communication device is the leader communication device.

16. The device according to claim 10, further comprising:

a communicating device switching element, wherein the communicating element includes a plurality of wireless communicating devices, each of which has a different communicating method, and the communicating device switching element selects one of the wireless communicating devices on the basis of a predetermined condition.

17. A communication device for acquiring a traffic information of an acquisition object, wherein the communication device is mounted on an automotive vehicle, the device comprising:

a communicating element for communicating with at least one of a plurality of cooperative communication devices, which is disposed around the communication device;

a request message transmitting element for transmitting a request message to at least one of a plurality of cooperative communication devices through the communicating element, wherein the request message includes a request vehicle identification information, a target zone information and an information for specifying the traffic information of the acquisition object, wherein the request vehicle identification information defines an identification information of a request vehicle, which requests the traffic information of the acquisition object, and wherein the target zone information defines a target zone, in which a target communication device as the acquisition object is disposed;

a request message receiving element for receiving the request message, which is transmitted from at least one of a plurality of cooperative communication devices;

a request message transferring element for transferring the request message to at least one of a plurality of cooperative communication devices, the request message received by the request message receiving element;

a response message transmitting element for transmitting a response message to at least one of a plurality of cooperative communication devices when the automotive vehicle is disposed in the target zone and when the traffic information of the acquisition object is capable of transmitting and retrieving from the traffic information in the communication device of the automotive vehicle, wherein the response message includes the request vehicle identification information and the traffic information of the acquisition object;

a response message receiving element for receiving the response message from at least one of a plurality of cooperative communication devices;

a response message transferring element for transferring the response message to at least one of a plurality of cooperative communication devices when the automotive vehicle is not the request vehicle;

an outputting element for outputting the traffic information of the acquisition object to an external circuit when the automotive vehicle is the request vehicle;

a request vehicle zone specifying element for specifying a request vehicle zone, in which the request vehicle is disposed; and a message transfer zone specifying element for specifying a message transfer zone, which includes the request vehicle zone and the target zone so that the message transfer zone links the request vehicle zone and the target zone, wherein the request message transmitting element transmits the request message together with an information of the request vehicle zone and the s target zone, the message transfer zone specifying element specifies the message transfer zone on the basis of the information of the request vehicle zone and the target zone, which are defined in the request message or in the response message, the request message transferring element determines whether the request message is transferred or not on the basis of the message transfer zone and a position of the automotive vehicle, and the response message transferring element determines whether the response message is transferred or not on the basis of the message transfer zone and the position of the automotive vehicle.

18. The device according to claim 17, further comprising:

a road information acquiring element for acquiring a traffic information of a road, wherein the message transfer zone specifying element specifies the message transfer zone along with a single passage or a plurality of passages linking between the request vehicle zone and the target zone on the basis of the traffic information of the road.

* * * * *